United States Patent
Sil et al.

(10) Patent No.: US 12,182,913 B2
(45) Date of Patent: Dec. 31, 2024

(54) GENERATING IMAGE EDITING PRESETS BASED ON EDITING INTENT EXTRACTED FROM A DIGITAL QUERY

(71) Applicant: Adobe Inc., San Jose, CA (US)

(72) Inventors: Arnab Sil, Khalisani (IN); Akash Srivastava, Lucknow (IN); Bhavana, Bhind (IN); Gorantla Meghana, Chirala (IN)

(73) Assignee: Adobe Inc., San Jose, CA (US)

( * ) Notice: Subject to any disclaimer, the term of this patent is extended or adjusted under 35 U.S.C. 154(b) by 52 days.

(21) Appl. No.: 17/823,429

(22) Filed: Aug. 30, 2022

(65) Prior Publication Data

US 2024/0070943 A1    Feb. 29, 2024

(51) Int. Cl.
*G06T 11/60* (2006.01)
*G06F 16/432* (2019.01)

(52) U.S. Cl.
CPC ............ *G06T 11/60* (2013.01); *G06F 16/434* (2019.01)

(58) Field of Classification Search
CPC .. G06F 16/29; G06F 16/2462; G06F 16/9537; G06F 8/20; G01N 2021/1793; G01N 21/17; G01S 19/42; G06Q 50/26
See application file for complete search history.

(56) References Cited

U.S. PATENT DOCUMENTS

| | | | |
|---|---|---|---|
| 2018/0330756 A1* | 11/2018 | MacDonald | G06F 16/951 |
| 2021/0027497 A1* | 1/2021 | Ding | G06N 3/02 |
| 2021/0103632 A1* | 4/2021 | Kadia | G06V 10/82 |
| 2021/0160435 A1* | 5/2021 | Pena | G06F 3/04883 |

OTHER PUBLICATIONS

Adobe.com; Get started with Lightroom for mobile (iOS); Date downloaded Oct. 3, 2022; https://helpx.adobe.com/lightroom-cc/using/work-with-lightroom-mobile-ios.html.
Sylvan, Rob; Lightroom Killer Tips; Give Recommended Presets a Try; Nov. 17, 2021; https://lightroomkillertips.com/give-recommended-presets-a-try/.

* cited by examiner

*Primary Examiner* — Ming Wu
(74) *Attorney, Agent, or Firm* — Keller Preece PLLC

(57) ABSTRACT

The present disclosure relates to systems, methods, and non-transitory computer readable media that recommend editing presets based on editing intent. For instance, in one or more embodiments, the disclosed systems receive, from a client device, a user query corresponding to a digital image to be edited. The disclosed systems extract, from the user query, an editing intent for editing the digital image. Further, the disclosed systems determine an editing preset that corresponds to the editing intent based on an editing state of an edited digital image associated with the editing preset. The disclosed systems generate a recommendation for the editing preset for provision to the client device.

20 Claims, 16 Drawing Sheets

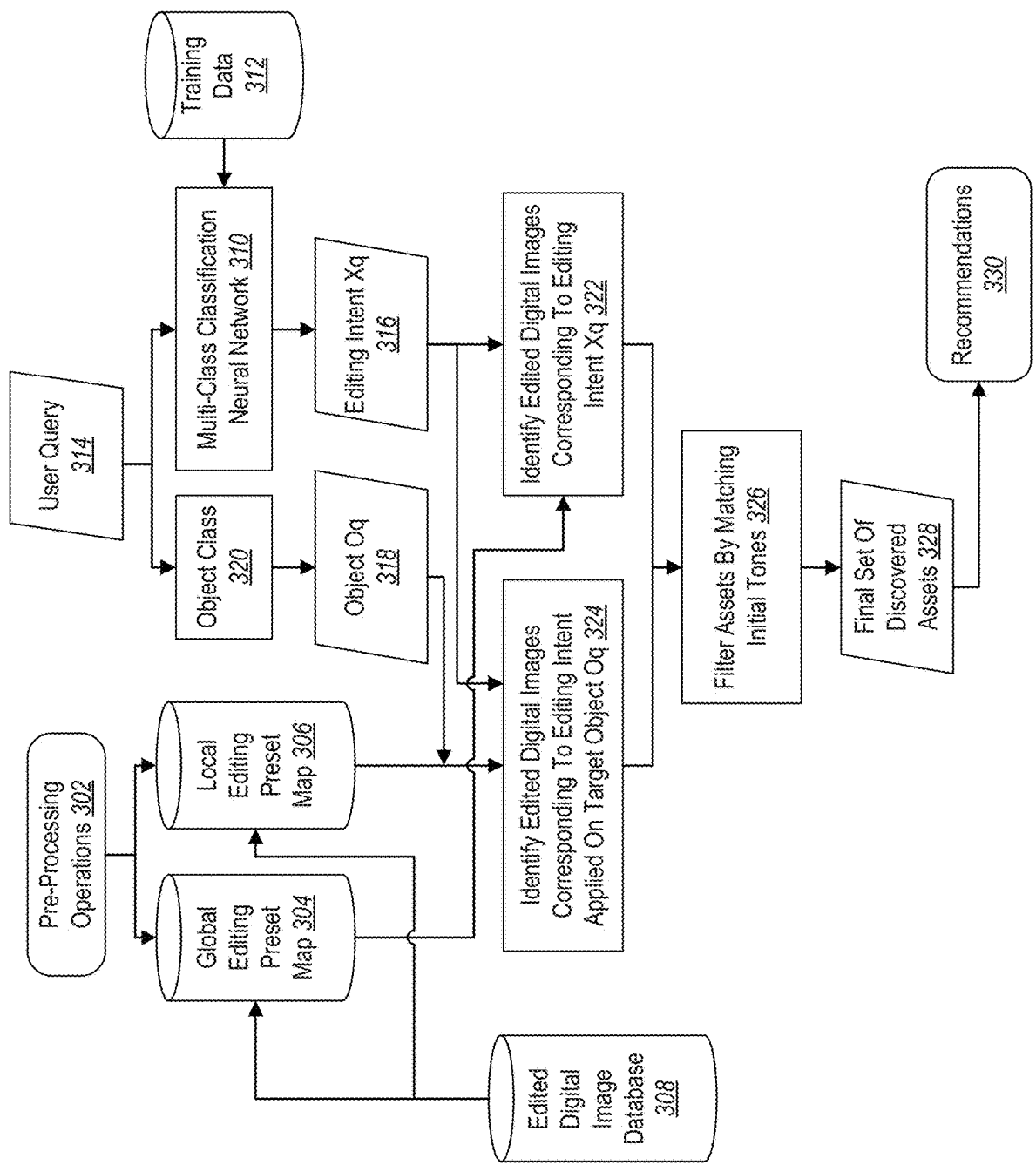

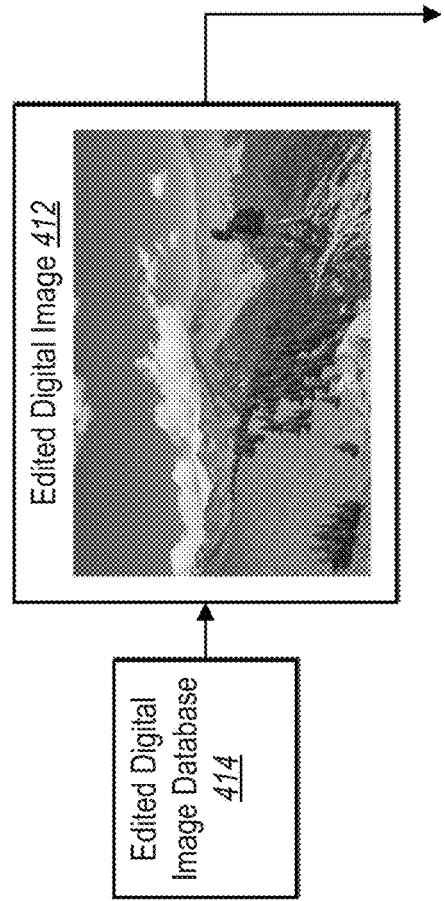

Global Editing Preset Map 420

| Map Key $X_i$ | | | | | Value(s) $P(X_i)$ |
|---|---|---|---|---|---|
| +1 | -1 | ... | 0 | 0 | [0324, 5673, 8926] — 424a |
| +1 | 0 | ... | 0 | -1 | [3876, 0301, 0313] — 424b |
| 0 | -1 | ... | 0 | 0 | [8762, 5211, 4839] — 424c |
| +1 | -1 | ... | +1 | 0 | [2734, 5123, 1879] — 424d |

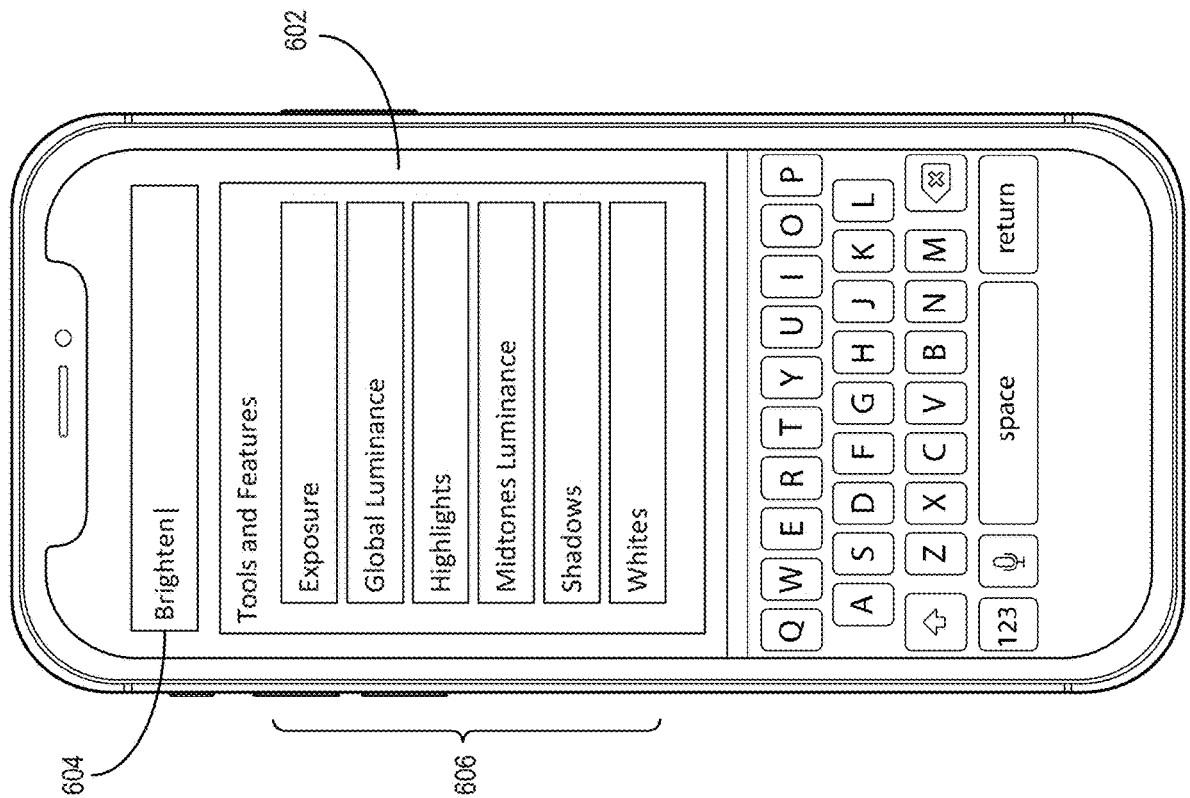

```
{
  "id", "Exposure2012",
  "title", "SSS/LREcoGlossary/Features/ACR/Exposure=Exposure",
  "description", "SSS/Organize/Edit/Explanation/Exposure/Description=Controls the brightness of your photo.",
  "additional_details", "SSS/Organize/Edit/Explanation/Exposure/Usage=Move left to make photo darker; move right to make the photo brighter.",
  "animation_name", "exposure",
  "panel", "light",
  "outer_panel_desktop", "edit",
  "outer_panel_tablet", "edit",
  "section_id", "light",
  "learn_how_tutorial_id", "944bf5e-9f50-41b2-babe-e707e94d2d4",
  "keywords", [
    "$$$/Organize/Edit/Explanation/Keywords/Bright=Bright",
    "$$$/Organize/Edit/Explanation/Keywords/Brighter=Brighter",
    "$$$/Organize/Edit/Explanation/Keywords/Brighten=Brighten",
    "$$$/Organize/Edit/Explanation/Exposure/Keywords/Compensate=Compensate",
    "$$$/Organize/Edit/Explanation/Exposure/Keywords/Compensation=Compensation",
    "$$$/Organize/Edit/Explanation/Exposure/Keywords/Dark=Dark",
    "$$$/Organize/Edit/Explanation/Keywords/Darker=Darker",
    "$$$/Organize/Edit/Explanation/Keywords/Darken=Darken",
    "$$$/Organize/Edit/Explanation/Exposure/Keywords/Exposure=Exposure",
    "$$$/Organize/Edit/Explanation/Exposure/Keywords/Light=Light",
    "$$$/ContextualHelp/Develop/Keyword/Lighter=Lighter",
    "$$$/Organize/Edit/Explanation/Highlights/Keywords/Lighten=Lighten",
    "$$$/ContextualHelp/Develop/Keyword/WrongExposure=WrongExposure",
    "$$$/ContextualHelp/Develop/Keyword/BadExposure=BadExposure",
    "$$$/ContextualHelp/Develop/Keyword/OverExposed=OverExposed",
    "$$$/ContextualHelp/Develop/Keyword/UnderExposed=UnderExposed"
  ],
  "related", [
    "Autotone",
    "Highlights2012",
    "Shadows2012",
    "Whites2012",
    "Blacks2012",
    "tone_curve"
  ]
}
```

*Fig. 6B*

```
{
  "proc_id": "17d7394c-f741-4c08-baa7-c14184855493",
  "proc_image_url": "",
  "proc_name", "$$$/Tutorial/bfaled18-907b-4263-8cea-069caaf88c13/Chapter/3/Name=Light",
  "proc_overview_text": "$$$/Tutorial/bfaled18-907b-4263-8cea-069caaf88c13/Chapter/3/OverviewText=Strawberry is the key flavor of this dish, and to tickle the viewers tastebuds, we'll focus on enhancing the color and texture of the fruit filling. Our first stop will be Light Panel.",
  "proc_step_list": [
    {
      "step_image_url": "",
      "step_name": "",
      "step_sentence_object_candidates": [
        {
          "pftObjectConfidence": 1,
          "pftObjectId": "XMP",
          "pftObjectName": "crs:Exposure2012",
          "pftObjectType": "CRTool",
          "pftValue": "0.5"
        }
      ],
      "step_sentence_text": "$$$/Tutorial/ bfaled18-907b-4263-8cea-069caaf88c13/Chapter/3/Step/1/SentenceText=Increase Exposure to breathe more light into the image.",
      "step_url": "",
      "step_video_url": ","
      "step_image_url": "",
      "step_name": "",
      "step_sentence_list": [
        {
          "step_node_id": "e0774c986-f703-4409-9237-cfb03789537a",
          "step_node_type": "slider",
          "step_sentence_object_candidates": [
            {
              "pftObjectConfidence": 1,
              "pftObjectId": "XMP",
              "pftObjectName": "crs:Whites2012",
              "pftObjectType": "CRTool",
```

*Fig. 6C*

GENERATING IMAGE EDITING PRESETS BASED ON EDITING INTENT EXTRACTED FROM A DIGITAL QUERY

BACKGROUND

Recent years have seen significant advancement in hardware and software platforms for digital image editing. For instance, digital image editing systems allow client devices to utilize preset configurations of pre-packaged edit settings to modify digital images. To illustrate, in some cases, a digital image editing system provides a client device a set of optional preset configurations that were previously created by the client device, created by other client devices, and/or curated by the system itself. Thus, such systems enable a client device to modify digital images without manually selecting the editing settings. Despite these advancements, conventional digital image editing systems often fail to flexibly adapt to the needs of a client device in providing preset configurations, leading to a significant amount of user interaction to select a relevant preset configuration.

SUMMARY

One or more embodiments described herein provide benefits and/or solve one or more of the foregoing or other problems in the art with systems, methods, and non-transitory computer-readable media that flexibly recommend editing presets to client devices that target editing intent. In particular, in one or more embodiments, the disclosed systems intelligently analyze a user query. The disclosed systems further implement a search system capable of searching among a wide range of available presets based on the analysis of the user query. For instance, in some cases, the disclosed systems search for presets that correspond to an editing intent extracted from the user query. In some implementations, the disclosed systems further search for presets that correspond to an object mentioned in the user query. Indeed, in some instances, the presets provide local edits to a digital image. In this manner, the disclosed systems provide flexibility in the presets that are recommended to a client device, reducing the amount of user interactions required for locating a relevant preset.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 3 illustrates an overview of the components and steps utilized by the intent-based preset system to recommend one or more editing presets in response to receiving a user query in accordance with one or more embodiments;

FIG. 4A illustrates a map key used by the intent-based preset system for a global editing preset map in accordance with one or more embodiments;

FIG. 4B illustrates a diagram for determining an editing state of an edited digital image in accordance with one or more embodiments;

FIG. 4C illustrates a global editing preset map generated by the intent-based preset system in accordance with one or more embodiments;

FIG. 6A illustrates a graphical user interface showing the mapping of keywords to editing operations implemented by this feature in accordance with one or more embodiments;

FIG. 6B illustrates a sample mapping of a hardcoded expert curated repository utilized by the intent-based preset system to learn parameters for a multi-class classification neural network in accordance with one or more embodiments;

FIG. 6C illustrates a sample portion of an editing operation tutorial document utilized by the intent-based preset system to learn parameters for a multi-class classification neural network in accordance with one or more embodiments;

DETAILED DESCRIPTION

Figure 1:
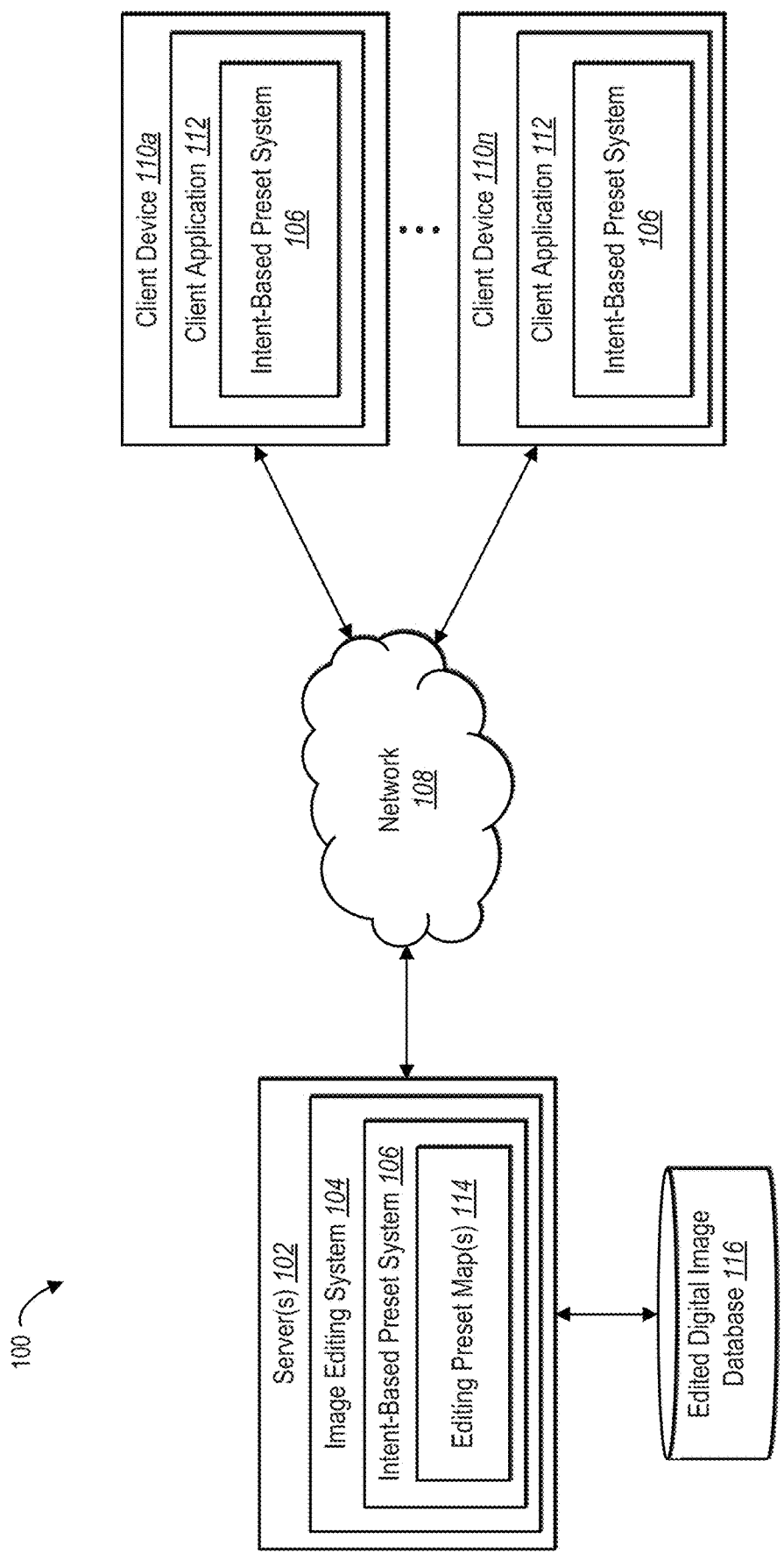
FIG. 1 illustrates an example environment in which an intent-based preset system operates in accordance with one or more embodiments.

One or more embodiments described herein include an intent-based preset system that flexibly recommends editing styles to a client device based on a received user query. For instance, in one or more embodiments, the intent-based preset system analyzes a received user query to extract information—such as an editing intent and/or an object—that indicates targeted modifications for a digital image. The intent-based preset system searches for one or more presets based on the extracted information. For example, in some cases, the intent-based preset system accesses one or more indices that map previously edited digital images to corresponding edits to retrieve presets that are relevant to the extracted information for recommendation to the client device. In some instances, the recommended presets apply global edits in accordance with the user query. In some embodiments, however, the recommended presets apply local edits.

To illustrate, in one or more embodiments, the intent-based preset system receives, from a client device, a user query corresponding to a digital image to be edited. The intent-based preset system extracts, from the user query, an editing intent for editing the digital image. Further, the intent-based preset system determines an editing preset that corresponds to the editing intent based on an editing state of an edited digital image associated with the editing preset. The intent-based preset system generates, for provision to the client device, a recommendation for the editing preset.

As just mentioned, in one or more embodiments, the intent-based preset system recommends, to a client device, an editing preset for editing a digital image. In particular, the intent-based preset system recommends an editing preset that is associated with an edited digital image. In other words, the intent-based preset system recommends, for editing a digital image, an editing preset that includes one or more pre-saved editing settings that were previously used to modify another digital image.

In one or more embodiments, the intent-based preset system builds one or more editing preset maps for use in retrieving editing presets to recommend. In particular, the intent-based preset system builds one or more editing preset maps that map edited digital images to editing operations and corresponding editing values. In some cases, the intent-based preset system determines an editing state for an edited digital image and adds the edited digital image to an editing preset map based on its editing state.

In some embodiments, the intent-based preset system generates a global editing preset map that corresponds to global edits applied to the represented edited digital images. In some implementations, the intent-based preset system generates a local editing preset map that corresponds to local edits applied to the represented edited digital images (e.g., applied to regions or objects portrayed in the edited digital images).

As further mentioned above, in one or more embodiments, the intent-based preset system recommends an editing preset to a client device in response to receiving a user query corresponding to a digital image to be edited. In some embodiments, the intent-based preset system analyzes the user query to extract an editing intent for editing the digital image. For instance, in some cases, the intent-based editing system utilizes a multi-class classification neural network to extract the editing intent from the user query.

In some implementations, the intent-based preset system further analyzes the user query to identify an object referenced in the user query. For instance, in some cases, the intent-based preset system performs a rule-based search of the user query to extract one or more object keywords. Accordingly, the intent-based preset system determines whether the user query targets an object portrayed in the digital image for editing.

In one or more embodiments, the intent-based preset system utilizes one of the editing preset maps to retrieve editing presets for recommendation to the client device based on the editing intent extracted from the user query. For instance, in some embodiments, the intent-based preset system retrieves editing presets that are associated with a map key that corresponds to the extracted editing intent. In some cases, the intent-based preset system determines which editing preset map to utilize based on whether the user query references an object. For instance, in some embodiments, where the user query does not reference an object, the intent-based preset system utilizes the global editing preset map to retrieve the editing presets. In some instances, where the user query does reference an object, the intent-based preset system utilizes the local editing preset map to retrieve the editing presets.

In some implementations, the intent-based preset system further filters the editing presets retrieved from the editing preset map. Indeed, in some cases, the intent-based preset system retrieves a set of editing presets from the editing preset map and removes one or more editing presets from the set. For instance, in some embodiments, the intent-based preset system removes an editing preset from the set upon determining that an initial tone of the edited digital image associated with the editing preset does not correspond to a current tone of the digital image to be edited. Accordingly, the intent-based preset system recommends, to the client device, the one or more editing presets that remain in the set.

In some cases, the intent-based preset system utilizes a graphical user interface to recommend editing presets to a client device. Indeed, in some embodiments, the intent-based preset system receives a user query from a client device via a graphical user interface displayed on the client device. The intent-based preset system further provides one or more recommended editing presets for display within the graphical user interface in response.

As mentioned above, conventional digital image editing systems suffer from several technological shortcomings that result in inflexible and inefficient operation. For instance, many conventional systems are inflexible in that they take a rigid approach to providing a client device with editing presets. In particular, many conventional systems provide the same editing presets to a client device without regard to the needs of the client device in a given editing scenario. In some instances, conventional systems provide every available editing preset to a client device regardless of the context in which a digital image is to be edited. As such, these systems fail to flexibly accommodate and adapt to changing editing scenarios. In addition, conventional systems are often limited to offering editing preset that correspond to global edits of a digital image. Thus, these systems fail to provide value where a client device intends to edit selected regions or objects portrayed in a digital image.

Further, conventional digital image editing systems often suffer from inefficiencies. In particular, conventional systems typically require a significant number of user interactions with a client device in order to locate and select an editing preset that is relevant to the scenario in which a digital image is to be edited. Indeed, as discussed above, many conventional systems provide the same set of editing presets (e.g., a set containing every available editing preset) to a client device regardless of the editing scenario. Accordingly, such conventional systems require a significant number of user interactions to browse through and narrow down the available editing presets to one or more options that are relevant to a given editing scenario.

The intent-based preset system provides several advantages over conventional systems. For example, the intent-based preset system improves the flexibility and functionality of implementing computing devices when compared to conventional systems. Indeed, by utilizing an editing intent to select one or more editing presets to provide to a client device, the intent-based editing system flexibly adapts to various editing scenarios. In particular, the intent-based editing system flexibly provides editing presets that are relevant to a given editing scenario (e.g., useful to the client device in applying desired edits to a digital image). Additionally, the intent-based preset system offers improved functionality by providing editing presets that correspond to local edits. Accordingly, the intent-based preset system is more robust when compared to conventional systems in terms of the editing presets made available to client devices.

Additionally, the intent-based preset system can improve the efficiency of implementing computing devices when compared to conventional systems. Indeed, by recommending editing presets in accordance with an editing intent for editing a digital image, the intent-based preset system reduces the interactive steps needed to locate and select an editing preset that is relevant to a given editing scenario. Indeed, the intent-based editing system utilizes a graphical user interface to execute a workflow that learns the needs of an editing scenario (e.g., via a received user query) and provides relevant editing presets in response with reduced reliance on user interactivity.

Additional detail regarding the intent-based preset system will now be provided with reference to the figures. FIG. 1 illustrates a schematic diagram of an exemplary system environment 100 in which an intent-based preset system 106 operates. As illustrated in FIG. 1, the environment 100 includes a server(s) 102, a network 108, client devices 110a-110n, and an edited digital image database 116.

Although the environment 100 of FIG. 1 is depicted as having a particular number of components, the environment 100 is capable of having any number of additional or alternative components (e.g., any number of servers, client devices, edited digital image databases, or other components in communication with the intent-based preset system 106 via the network 108). Similarly, although FIG. 1 illustrates a particular arrangement of the server(s) 102, the network 108, the client devices 110a-110n, and the edited digital image database 116, various additional arrangements are possible.

The server(s) 102, the network 108, the client devices 110a-110n, and the edited digital image database 116 are communicatively coupled with each other either directly or indirectly (e.g., through the network 108 discussed in greater detail below in relation to FIG. 10). Moreover, the server(s) 102 and the client devices 110a-110n include one of a variety of computing devices (including one or more computing devices as discussed in greater detail with relation to FIG. 10).

As mentioned above, the environment 100 includes the server(s) 102. In one or more embodiments, the server(s) 102 generates, stores, receives, and/or transmits data including user queries and editing presets. In one or more embodiments, the server(s) 102 comprises a data server. In some implementations, the server(s) 102 comprises a communication server or a web-hosting server.

In one or more embodiments, the image editing system 104 provides functionality by which a client device (e.g., a user of one of the client devices 110a-110n) generates, edits, manages, and/or stores digital images. For example, in some instances, a client device sends a digital image to the image editing system 104 hosted on the server(s) 102 via the network 108. The image editing system 104 then provides options that the client device may use to edit the digital image, store the digital image, and subsequently search for, access, and view the digital image. For instance, in some cases, the image editing system 104 provides editing operations that can be used to modify a digital image.

Additionally, the server(s) 102 include the intent-based preset system 106. In one or more embodiments, via the server(s) 102, the intent-based preset system 106 receives a user query for editing a digital image from a client device (e.g., one of the client devices 110a-110n). Via the server(s) 102, the intent-based preset system 106 extracts an editing intent for editing the digital image from the user query. Further, the intent-based preset system 106, via the server(s) 102, determines an editing preset that corresponds to the editing intent (e.g., using an editing preset map(s) 114) based on an editing state of an edited digital image associated with the editing preset. The intent-based preset system 106 further, via the server(s) 102, generates a recommendation for using the editing preset. Example components of the intent-based preset system 106 will be described below with regard to FIG. 8.

In one or more embodiments, the edited digital image database 116 stores edited digital images. For example, in some instances, the edited digital image database 116 stores edited digital images collected by the server(s) 102 (e.g., the intent-based preset system 106 via the server(s) 102). In some cases, the edited digital image database 116 further stores metadata for the edited digital images (e.g., metadata indicating editing operations applied to the edited digital images) and/or the digital images from which the edited digital images where created (e.g., the initial digital images). The edited digital image database 116 further provides access to the edited digital images to the intent-based preset system 106. Though FIG. 1, illustrates the edited digital image database 116 as a distinct component, one or more embodiments include the edited digital image database 116 as a component of the server(s) 102, the image editing system 104, or the intent-based preset system 106.

In one or more embodiments, the client devices 110a-110n include computing devices that can access, edit, implement, modify, store, and/or provide, for display, digital images and/or editing presets. For example, the client devices 110a-110n include smartphones, tablets, desktop computers, laptop computers, head-mounted-display devices, or other electronic devices. The client devices 110a-110n include one or more applications (e.g., the client application 112) that can access, edit, implement, modify, store, and/or provide, for display, digital images and/or editing presets. For example, in some embodiments, the client application 112 includes a software application installed on the client devices 110a-110n. In other cases, however, the client application 112 includes a web browser or other application that accesses a software application hosted on the server(s) 102.

The intent-based preset system 106 can be implemented in whole, or in part, by the individual elements of the environment 100. Indeed, as shown in FIG. 1 the intent-based preset system 106 can be implemented with regard to the server(s) 102 and/or at the client devices 110a-110n. In particular embodiments, the intent-based preset system 106 on the client devices 110a-110n comprises a web application, a native application installed on the client devices 110a-110n (e.g., a mobile application, a desktop application, a plug-in application, etc.), or a cloud-based application where part of the functionality is performed by the server(s) 102.

In additional or alternative embodiments, the intent-based preset system 106 on the client devices 110a-110n represents and/or provides the same or similar functionality as described herein in connection with the intent-based preset system 106 on the server(s) 102. In some implementations, the intent-based preset system 106 on the server(s) 102 supports the intent-based preset system 106 on the client devices 110a-110n.

For example, in some embodiments, the intent-based preset system 106 on the server(s) 102 train one or more machine learning models described herein (e.g., a multi-class classification neural network for extracting editing intents from user queries). The intent-based preset system 106 on the server(s) 102 provides the one or more trained machine learning models to the intent-based preset system 106 on the client devices 110a-110n for implementation. Accordingly, although not illustrated, in one or more embodiments the client devices 110a-110n utilize the one or more trained machine learning models to extract editing intents from user queries.

In some embodiments, the intent-based preset system 106 includes a web hosting application that allows the client devices 110a-110n to interact with content and services hosted on the server(s) 102. To illustrate, in one or more implementations, the client devices 110a-110n accesses a web page or computing application supported by the server(s) 102. The client devices 110a-110n provide input to the server(s) 102 (e.g., user queries). In response, the intent-based preset system 106 on the server(s) 102 utilizes the provided input to generate recommendations for editing presets. The server(s) 102 then provides the recommendations to the client devices 110a-110n.

In some embodiments, though not illustrated in FIG. 1, the environment 100 has a different arrangement of components and/or has a different number or set of components altogether. For example, in certain embodiments, the client devices 110a-110n communicate directly with the server(s) 102 bypassing the network 108. As another example, the environment 100 includes a third-party server comprising a content server and/or a data collection server.

Figure 2:
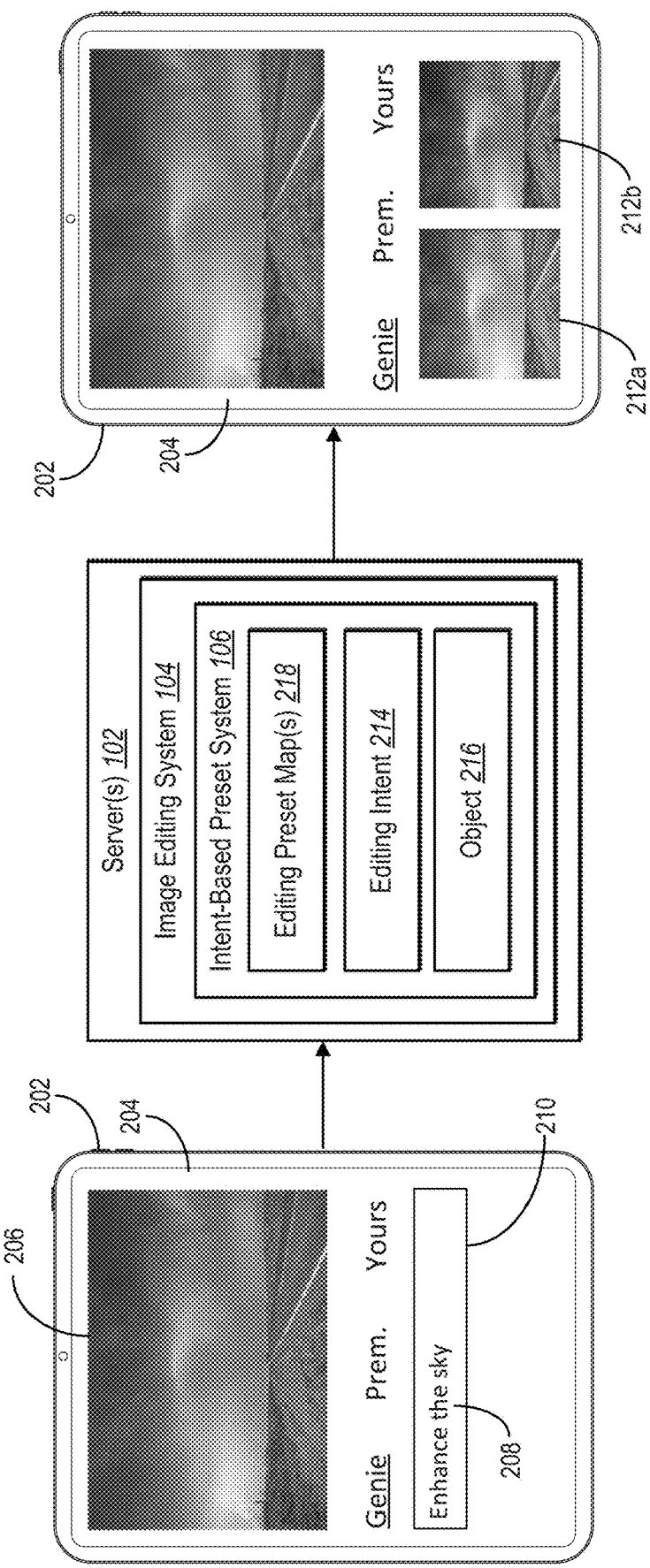
FIG. 2 illustrates an overview diagram of the intent-based preset system generating a recommendation for an editing preset in accordance with one or more embodiments.

As mentioned above, in one or more embodiments, the intent-based preset system 106 generates a recommendation for an editing preset in accordance with an editing intent for editing a digital image. FIG. 2 illustrates an overview diagram of the intent-based preset system 106 generating a recommendation for an editing preset in accordance with one or more embodiments.

In one or more embodiments, an editing preset includes a set of one or more editing settings associated with an edited digital image (e.g., a digital image that was previously edited). In particular, in some embodiments, an editing preset includes one or more pre-saved editing settings that were used in generating an edited digital image (e.g., modifying an initial digital image to generate the edited digital image). For example, in some embodiments, an editing preset includes one or more editing operations and one or more corresponding editing values that were used to generate an edited digital image.

In one or more embodiments, an editing operation includes a process for performing a modification on a digital image. In particular, in some embodiments, an editing operation includes an action (or a series of actions) used to modify at least one attribute of a digital image. For instance, in some cases, an editing operation includes an editing tool that can be used to modify a digital image, or a series of steps implemented by the editing tool in modifying the digital image. In some cases, an editing operation includes backend processing steps implemented to modify a digital image (e.g., steps for changing values of the pixels of the digital image). In some implementations, an editing operation additionally or alternatively includes front-end processing steps used to modify a digital image (e.g., user interactions, such as selecting a region of the digital image to modify). Some examples of editing operations include, but are not limited to, an exposure operation, a contrast operation, a highlight operation, a sharpening operation, and a dehaze operation.

In one or more embodiments, an editing value includes a value associated with an editing operation used to modify a digital image. In particular, in some embodiments an editing value includes a value that indicates or controls how the corresponding editing operation was/is used to modify a digital image. For example, in some cases an editing value includes a value that indicates a degree or direction of change of an attribute of a digital image (e.g., whether the exposure of a digital image was increased or decreased—and by how much—to brighten or darken the digital image) or a resulting value for the attribute of the digital image (e.g., the resulting exposure value for the digital image).

As previously mentioned, in one or more embodiments, the intent-based preset system 106 recommends an editing preset in response to receiving a user query. Indeed, as shown in FIG. 2, the intent-based preset system 106 receives a user query 208 from a client device 202. In particular, the intent-based preset system 106 provides a graphical user interface 204 for display on the client device 202 and receives the user query 208 via the graphical user interface 204. As an example, FIG. 2 illustrates that the intent-based preset system 106 provides a text box 210 for display within the graphical user interface 204 and receives the user query 208 via input entered into the text box 210, though the intent-based preset system 106 utilizes various methods of receiving user queries in various embodiments.

In one or more embodiments, a user query includes a request corresponding to a digital image to be edited. Indeed, as shown in FIG. 2, the user query 208 received from the client device 202 corresponds to a digital image 206 to be edited. In particular, in some embodiments, a user query includes a request for assistance in performing a specified modification on a digital image. To illustrate, in some implementations, a user query includes a request for one or more editing presets that could be used to perform a targeted modification to a client device. In some cases, a user query includes text (e.g., natural language text) and/or other elements that indicate the modification to be made.

As further shown in FIG. 2, the intent-based preset system 106 generates and provides recommendations for editing presets 212a-212b to the client device 202 in response to receiving the user request. In particular, the intent-based preset system 106 provides the recommendations for the editing presets 212a-212b for display within the graphical user interface 204. It should be understood that the intent-based preset system 106 provides various numbers of recommended editing presets in various embodiments.

As indicated in FIG. 2, the intent-based preset system 106 generates the recommendations for the editing presets 212a-212b using an editing intent 214. In one or more embodiments, an editing intent includes an indication of a modification to be made to a digital image. In particular, in some embodiments, an editing intent includes a representation of one or more editing operations to be applied to a digital image. In some cases, an editing intent includes a representation of one or more editing values to be applied to the digital image.

In one or more embodiments, the intent-based preset system 106 extracts the editing intent 214 from the user query 208. For instance, as will be discussed in more detail below, the intent-based preset system 106 utilizes a multi-class classification neural network to extract the editing intent 214 from the user query 208 in some embodiments. In some instances, the intent-based preset system 106 extracts the editing intent 214 from the user query 208 by generating an editing intent vector from the user query 208. In one or more embodiments, an editing intent vector includes a vector having values representative of an editing intent. For instance, in some cases, an editing intent vector includes a vector having vector slots that represent editing operations (e.g., the editing operations indicated by the editing intent or all potential editing operations) and values for the vector slots that represent corresponding editing values.

Additionally, as indicated in FIG. 2, the intent-based preset system 106 further generates the recommendations for the editing presets 212a-212b using an object 216. Indeed, in one or more embodiments, the intent-based preset system 106 determines the object 216 is referenced in the user query 208. For example, in some implementations, the intent-based preset system 106 utilizes a rule-based search to determine that the object 216 is referenced, as will be discussed more below. In one or more embodiments, the object 216 referenced in the user query 208 is portrayed in the digital image 206. Accordingly, in some embodiments, the intent-based preset system 106 determines that the modifications to the digital image 206 are to be targeted to the object 216. Though FIG. 2 shows the intent-based preset system 106 determining the editing intent 214 and the object 216 from the user query 208, it should be understood that the intent-based preset system 106 responds to user queries that do not reference an object in some implementations.

Further, as illustrated in FIG. 2, the intent-based preset system 106 generates the recommendations for the editing presets 212a-212b utilizing one or more editing preset maps 218. In one or more embodiments, an editing preset map includes an index that maps edited digital images to editing operations and editing values. In particular, in some cases, an editing preset map includes a mapping of edited digital images (or identifiers for the edited digital images) to the editing operations and editing values used in creating those edited digital images. To illustrate, in some cases, an editing preset map includes map keys representing editing operations and editing values (and potentially targeted objects) and values associated with the map keys that represent the corresponding edited digital images. In some cases, an editing preset map includes a global editing preset map that corresponds to global edits of edited digital image or a local editing preset map that corresponds to local edits of edited digital images. More detail regarding the creation and configuration of editing preset maps will be provided below.

Thus, as shown in FIG. 2, the intent-based preset system 106 receives the user query 208 from the client device 202, analyzes the user query 208 to identity relevant information (e.g., the editing intent 214 and the object 216), generates recommendations for the editing presets 212a-212b based on the identified information and using the one or more editing preset maps 218, and provides the recommendations to the client device 202 in response.

As indicated by FIG. 2, in some embodiments, the intent-based preset system 106 provides a visual element with the editing presets 212a-212b that are recommended. In particular, the intent-based preset system 106 generates and provides a preview thumbnail for each recommended editing preset. The preview thumbnail for a recommended editing preset indicates how the digital image would appear if the recommended editing preset were selected. Thus, the intent-based preset system 106 enables the client device 202 to display various potential results for ease in comparison and selection from among the recommendations.

In one or more embodiments, the intent-based preset system 106 modifies the digital image 206 using one of the editing presets 212a-212b. For instance, in some cases, the intent-based preset system 106 detects a selection of one of the editing presets 212a-212b via the graphical user interface 204. The intent-based preset system 106 further modifies the digital image 206 using the selected editing preset.

Thus, in one or more embodiments, the intent-based preset system 106 provides improved efficiency when compared to conventional systems. Indeed, where many conventional systems require a significant amount of user interactions to browse through numerous available options to find editing presets that are relevant to a desired edit, the intent-based preset system 106 efficiently provides relevant recommendations based on editing intent. In particular, the intent-based preset system 106 utilizes a graphical user interface that displays recommendations while significantly reducing the amount of user interactions required to locate relevant editing presets.

FIG. 3 illustrates an overview of the components and steps utilized by the intent-based preset system 106 to recommend one or more editing presets in response to receiving a user query in accordance with one or more embodiments. In particular, FIG. 3 and the corresponding discussion provides a broad overview of these components and steps. More detail will be provided with reference to the figures that follow.

As shown in FIG. 3, the intent-based preset system 106 performs pre-processing operations 302. In particular, in some embodiments, the intent-based preset system 106 performs the pre-processing operations 302 before receiving a user query. Thus, in some cases, the intent-based preset system 106 already has the results of the pre-processing operations 302 at the time of receiving a user query.

For instance, as shown in FIG. 3, the intent-based preset system 106 generates a global editing preset map 304. Further, the intent-based preset system 106 generates a local editing preset map 306. As further shown, the intent-based preset system 106 generates the global editing preset map 304 and/or the local editing preset map 306 utilizing a plurality of edited digital images from an edited digital images database 308. For instance, in some cases, the intent-based preset system 106 utilizes the plurality of edited digital images (or identifiers for the plurality of edited digital images) as values that are associated with map keys within the global editing preset map 304 and/or the local editing preset map 306. To illustrate, as indicated by FIG. 3, the intent-based preset system 106 associates map keys $X_i$ with corresponding values $P(X_i)$ within the global editing preset map 304 and associates map keys $(O_i, X_i)$ with corresponding values $P(O_i, X_i)$ within the local editing preset map 306.

Though not explicitly shown as one of the pre-processing operations 302, the intent-based preset system 106 further learns parameters for a multi-class classification neural network 310. Generally, in one or more embodiments, a neural network includes a type of machine learning model, which can be tuned (e.g., trained) based on inputs to approximate unknown functions used for generating the corresponding outputs. In particular, in some embodiments, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

More specifically, in one or more embodiments, a multi-class classification neural network includes a computer-implemented neural network that determines editing intents from user queries. In particular, in some embodiments, a multi-class classification neural network includes a computer-implemented neural network that analyzes a user query corresponding to a digital image to be edited and extracts an editing intent based on the analysis. Indeed, in some cases, a multi-class classification neural network determines editing operations and corresponding editing values that are indicated by a user query. In some cases, a multi-class classification neural network generates an editing intent vector from a user input.

Thus, in one or more embodiments, the intent-based preset system 106 learns parameters for the multi-class classification neural network 310 that facilitate the extraction of editing intents from user queries. As show in FIG. 3, the intent-based preset system 106 learns the parameters for the multi-class classification neural network 310 utilizing training data 312. In some cases, as will be discussed, the intent-based preset system 106 utilizes various types of training data in learning the parameters for the multi-class classification neural network 310.

Additionally, as illustrated in FIG. 3, the intent-based preset system 106 receives a user query 314. As shown, the intent-based preset system 106 utilizes the multi-class classification neural network 310 to extract an editing intent 316 (represented as $X_q$) from the user query 314. For example, in some cases, the intent-based preset system 106 utilizes the multi-class classification neural network 310 to generate an editing intent vector from the user query 314.

As further shown in FIG. 3, the intent-based preset system 106 also identifies or extracts an object 318 (represented as $O_q$) from the user query 314. In particular, the intent-based preset system 106 identifies or extracts the object 318 utilizing an object class 320. Indeed, in one or more embodiments, the intent-based preset system 106 maintains one or more pre-determined object classes. Further, the intent-based preset system 106 performs a rule-based search to extract an object keyword from the user query 314. To illustrate, in some embodiments, the intent-based preset system 106 generates a list of tokens from the user query 314 (e.g., while extracting the editing intent 316 from the user query 314). Thus, in some cases, the intent-based preset system 106 compares the tokens to the pre-determined object classes to determine whether the user query 314 references an object.

Additionally, as shown in FIG. 3, the intent-based preset system 106 performs an act 322 of identifying edited digital images that correspond to the editing intent 316. Alternatively, the intent-based preset system 106 performs an act 324 of identifying edited digital images corresponding to the editing intent 316 as applied to the object 318. In particular, as indicated by FIG. 3, the intent-based preset system 106 performs the act 322 or the act 324 using the global editing preset map 304 or the local editing preset map 306, respectively. In one or more embodiments, the intent-based preset system 106 determines whether to perform the act 322 or the act 324 (e.g., utilize the global editing preset map 304 or the local editing preset map 306, respectively, to identify edited digital images) based on whether the user query 314 references an object. For instance, upon determining that the user query 314 does not reference an object, the intent-based preset system 106 determines to perform the act 322 using the global editing preset map 304. On the other hand, upon determining that the user query 314 references the object 318, the intent-based preset system 106 determines to perform the act 324 using the local editing preset map 306. Accordingly, the intent-based preset system 106 identifies edited digital images that incorporate global edits or local edits in accordance with the user query 314.

As illustrated by FIG. 3, the intent-based preset system 106 further performs an act 326 of filtering the edited digital images retrieved from the global editing preset map 304 or the local editing preset map 306 based on an initial tone of the edited digital images. In particular, the intent-based preset system 106 removes, from the retrieved edited digital images, those edited digital images that do not have an initial tone (e.g., a tone of the digital image from which the edited digital image was created) that corresponds to a current tone of the digital image to be edited.

In one or more embodiments, a tone of a digital image includes an appearance of the digital image. In particular, in some embodiments, a tone of a digital image includes one or more visual characteristics of the digital image. For example, in some cases, tone includes color palette, shade, contrast, saturation, and/or brightness. In some cases, tone includes elements portrayed in a digital image, such as a background or one or more objects portrayed in the digital image. In some cases, tone includes a classification of the digital image.

Thus, as indicated in FIG. 3, the intent-based preset system 106 obtains a final set 328 of edited digital images. Further, the intent-based preset system 106 generates recommendations 330 using the final set 328. In particular, in some cases, the intent-based preset system 106 generates recommendations for editing presets associated with the edited digital images from the final set 328. In some embodiments, the intent-based preset system 106 provides the recommendations to the client device that submitted the user query 314. For instance, as indicated above, in some cases, the intent-based preset system 106 generates and provides preview thumbnails that indicate how the digital image would appear upon selection of the corresponding recommended editing presets.

Thus, by filtering the edited digital images retrieved from the global editing preset map 304 or the local editing preset map 306 based on their initial tone, the intent-based preset system 106 ensures that the editing presets that are recommended to the client device will have a desired effect on the digital image. For instance, by recommending editing presets for edited digital images associated with an initial tone that corresponds to the current tone of the digital image to be edited, a preview thumbnail provided by the intent-based preset system 106 will better indicate the final appearance of the digital image upon selection of its corresponding editing preset.

Figure 5A:
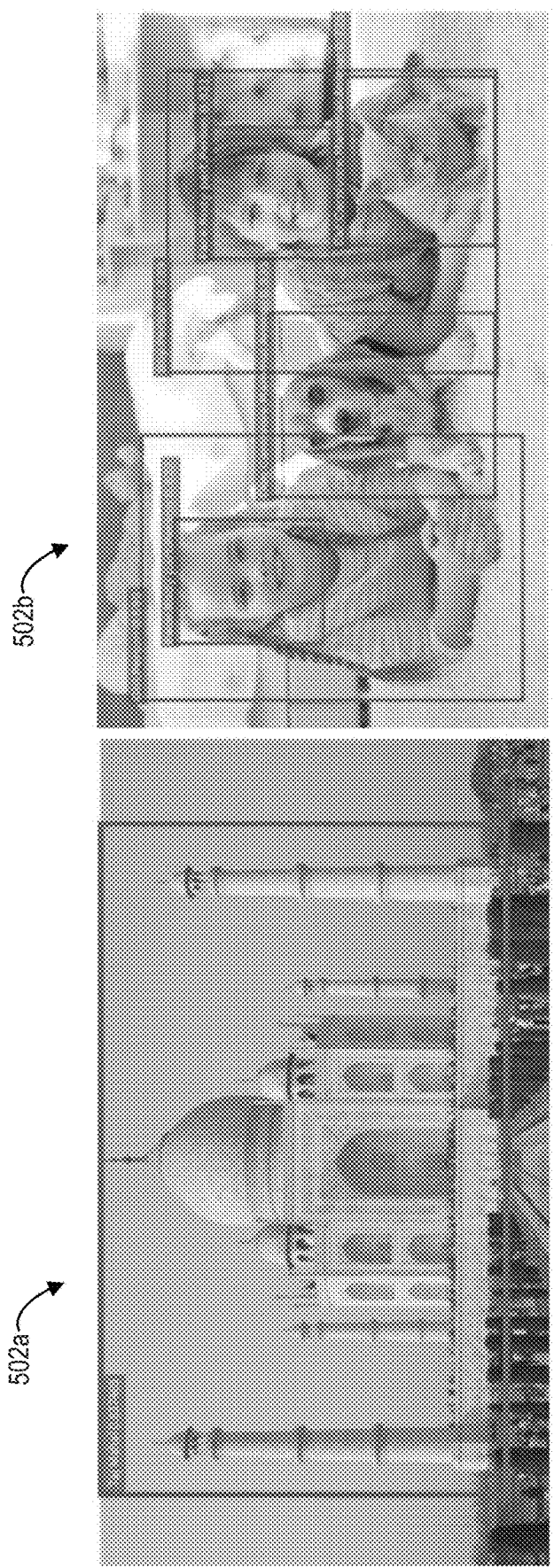
FIG. 5A illustrates the intent-based preset system detecting objects portrayed in edited digital images in accordance with one or more embodiments.
Figure 5B:
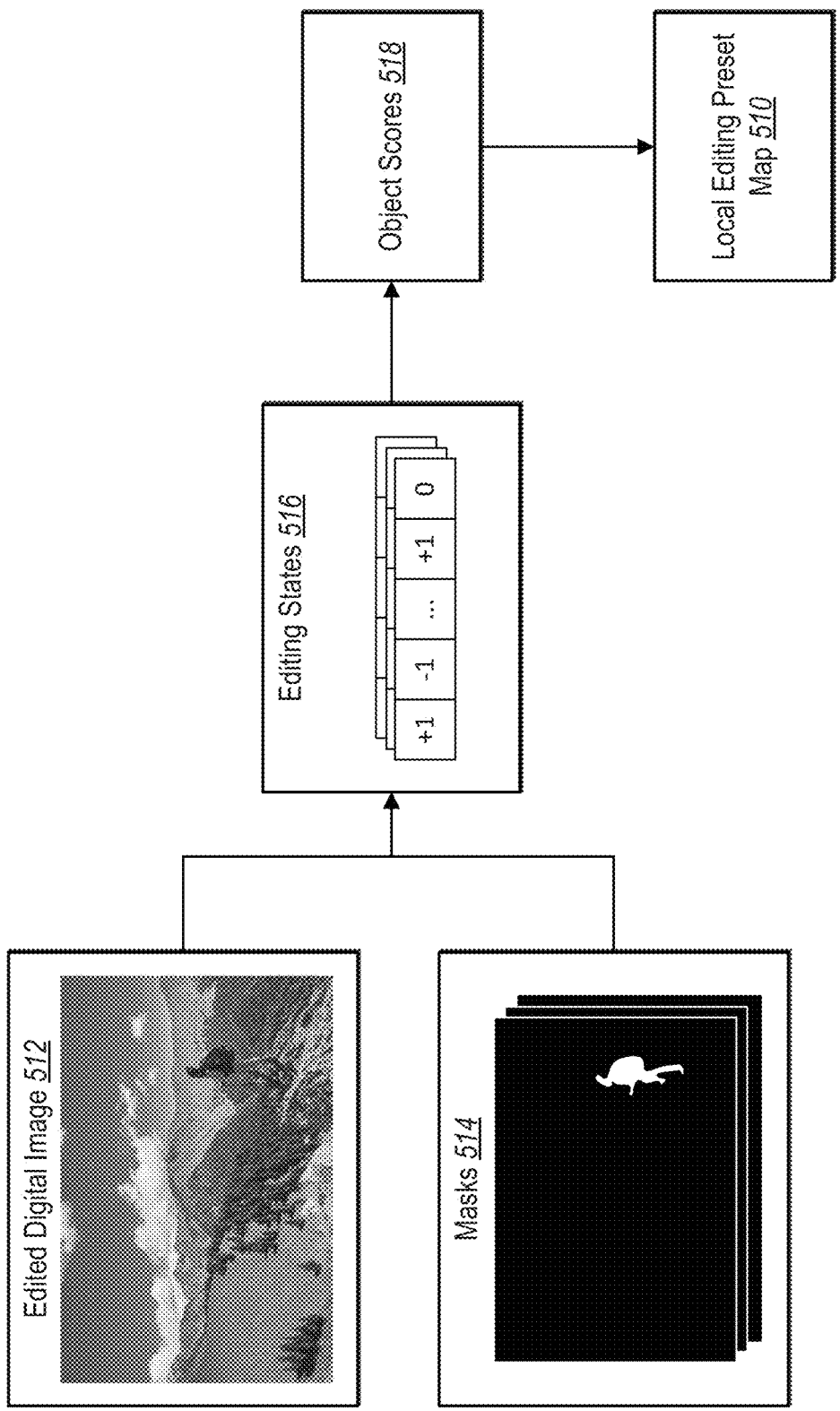
FIG. 5B illustrates a diagram for generating a local editing preset map utilizing edited digital images in accordance with one or more embodiments.
Figure 5C:
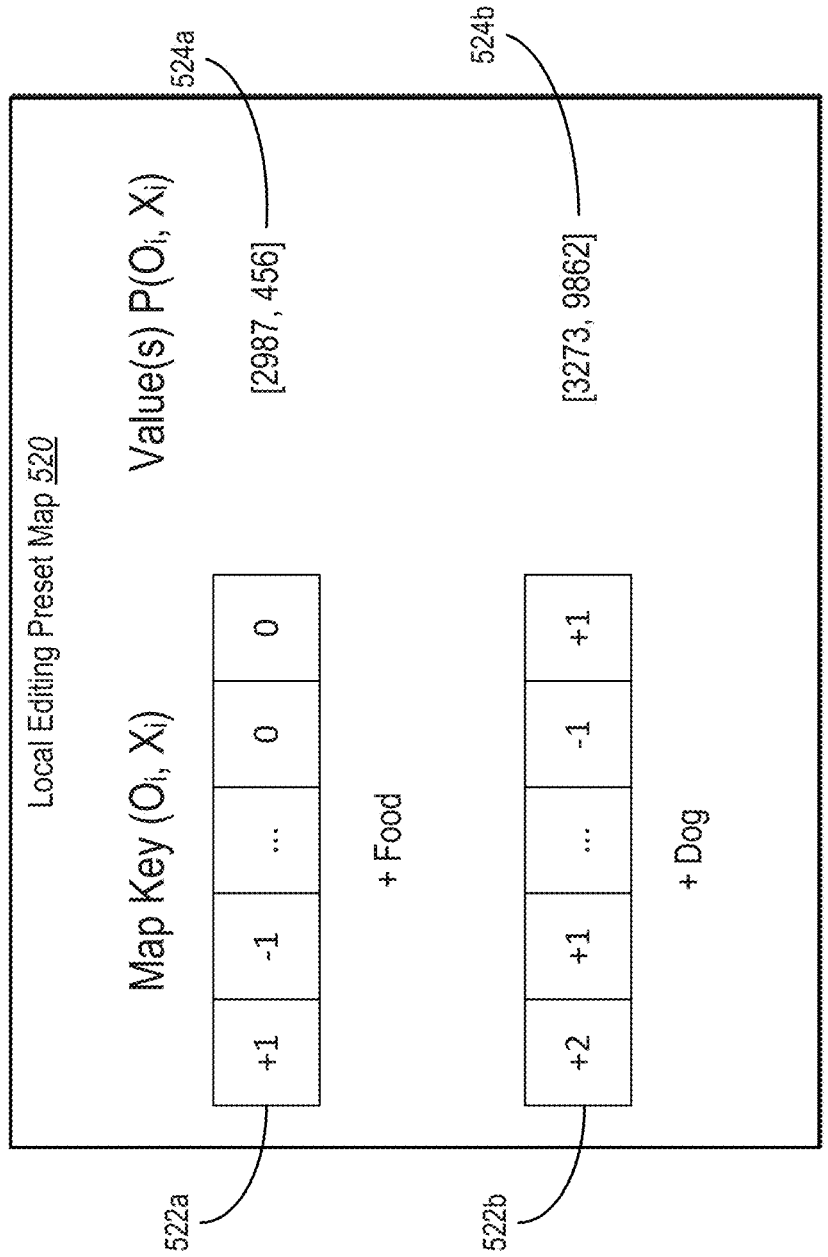
FIG. 5C illustrates a local editing preset map generated by the intent-based preset system in accordance with one or more embodiments.

As just discussed, in one or more embodiments, the intent-based preset system 106 performs various pre-processing steps before receiving a user query. FIGS. 4A-6D illustrate diagrams for performing these various pre-processing steps in accordance with one or more embodiments. In particular, FIGS. 4A-4C illustrate diagrams for generating a global editing preset map, FIGS. 5A-5C illustrate diagrams for generating a local editing preset map, and FIGS. 6A-6D illustrate diagrams for learning parameters for a multi-class classification neural network.

In one or more embodiments, in generating a global editing preset map, the intent-based preset system 106 generates one or more map keys for the global editing preset map. FIG. 4A illustrates a map key 400 used by the intent-based preset system 106 for a global editing preset map in accordance with one or more embodiments.

As shown in FIG. 4A, the intent-based preset system 106 generates the map key 400 for the global editing preset map by generating a vector of size M. Indeed, as illustrated, the map key 400 includes vector slots 402a-402m. In one or more embodiments, each vector slot corresponds to an available editing operation. Thus, in some cases, the intent-based preset system 106 generates the map key 400 to represent all available editing operations (e.g., where M represents the number of available editing operations).

As further shown in FIG. 4A, the intent-based preset system 106 populates the vector slots of the map key 400 with values. In particular, the intent-based preset system 106 populates the vector slots with editing values that correspond to the editing operations represented by the vector slots. More particularly, FIG. 4A shows that the map key 400 includes a signed vector. Indeed, the intent-based preset system 106 utilizes, as the editing value that populates a given vector slot, a zero value, a positive value, or a negative value. In or more embodiments, the intent-based preset system 106 utilizes a zero value to indicate that the map key 400 does not represent implementation of the corresponding editing operation. Further, the intent-based preset system 106 utilizes a positive value or a negative value to indicate that the map key 400 represents implementation of the corresponding editing operation. In particular, the intent-based preset system 106 utilizes the positive value or the negative value to indicate how that editing operation is represented. Thus, in some cases, the intent-based preset system 106 utilizes a positive value or a negative value to indicate whether the corresponding editing operation is representing as enhancing or diminishing an attribute (e.g., where +1 represents that the editing operation increments the value of a corresponding attribute of a digital image or −1 represents that the editing operation decrements the value of the corresponding attribute of the digital image).

As one example, in some embodiments, operations for darkening a digital image or brightening a digital image both correspond to an exposure operation. Thus, in some cases, the intent-based preset system 106 utilizes a positive value to within the vector slot corresponding to the exposure operation to indicate a brightening operation or utilizes a negative value within the vector slot to indicate a darkening operation.

In one or more embodiments, the intent-based preset system 106 generates a map key for multiple combinations of editing operations (e.g., using various combinations of editing values for the editing operations). For instance, in some cases, the intent-based preset system 106 generates a map key for each potential combination of editing operations. Accordingly, in some cases, the intent-based preset system 106 generates the global editing preset map to exhaustively represent all combinations of edits that could be made to a digital image. In some implementations, however, the intent-based preset system 106 selects a subset of editing operation combinations and generates map keys to represent the combinations included in the subset.

FIG. 4B illustrates a diagram for determining an editing state of an edited digital image in accordance with one or more embodiments. In one or more embodiments, an editing state includes modifications associated with an edited digital image. In particular, in some embodiments, an editing state includes modifications made to an initial digital image that result in the corresponding edited digital image. For example, in some instances, an editing state includes the editing operations applied to an initial digital image that result in the corresponding edited digital image. In some implementations, an editing state further includes the editing values that correspond to the applied editing operations. In one or more embodiments, an editing state includes a global editing state that corresponds to modifications made to a digital image as a whole (e.g., global edits). In some embodiments, an editing state includes a local editing state that corresponds to modifications made to a portion of a digital image (e.g., local edits). In some cases, the intent-based preset system 106 determines an editing state for a mask associated with a digital image. Indeed, in some instances, the intent-based preset system 106 determines an editing state (e.g., a local editing state) that includes modifications applied to a digital image by the mask or applied to a portion of a digital image associated with the mask.

Indeed, as shown in FIG. 4B, the intent-based preset system 106 determines an editing state 410 for an edited digital image 412. In particular, as indicated, the edited digital image 412 is part of a plurality of edited digital images maintained within an edited digital image database 414 (or some other system or data structure that stores and/or provides access to a plurality of edited digital images). Accordingly, in some cases the intent-based preset system 106 similarly determines an editing state for each edited digital image from the plurality of edited digital images.

In one or more embodiments, the intent-based preset system 106 determines the editing state 410 for the edited digital image 412 utilizing metadata associated with the edited digital image. For instance, in some cases, the intent-based preset system 106 maintains metadata for the edited digital images stored within the edited digital image database 414. For instance, in some cases, the intent-based preset system 106 maintains, as part of the metadata for the edited digital image 412, the editing operations and editing values used to create the edited digital image 412.

As indicated by FIG. 4B, in some cases, the intent-based preset system 106 generates a vector representation of the editing state 410. In particular, the intent-based preset system 106 generates a vector representation having vector slots that correspond to editing operations and are populated with editing values. In some cases, the intent-based preset system 106 generates the vector representation to have size M, similar to the map key 400 discussed above with referenced to FIG. 4A. Thus, in some cases, the intent-based preset system 106 generates the vector representation of the editing state 410 to explicitly indicate editing operations that were not applied in creating the edited digital image 412, editing operations that were applied, and how those editing operations were applied (e.g., whether an editing operation was applied to enhance or diminish an attribute).

FIG. 4C illustrates a global editing preset map 420 generated by the intent-based preset system 106 in accordance with one or more embodiments. In one or more embodiments, the intent-based preset system 106 generates the global editing preset map 420 utilizing map keys (e.g., the map key 400 of FIG. 4A) and corresponding digital images. Indeed, as shown, the global editing preset map 420 includes map keys 422a-422d and edited digital image sets 424a-424d.

In one or more embodiments, the map keys 422a-422d of the global editing preset map 420 represent potential global edits. For instance, as previously discussed, in some cases, the intent-based preset system 106 generates a map key for each available combination of editing operations. Thus, in some cases, the intent-based preset system 106 generates the global editing preset map 420 to include a map key for each available combination. In some cases, however, the intent-based preset system 106 includes map keys for a subset of editing operation combinations within the global editing preset map 420.

As shown in FIG. 4C, the intent-based preset system 106 includes, within the edited digital image sets 424a-424d, identifiers that represent the included edited digital images. It should be understood, however, that the intent-based preset system 106 can utilize various placeholders to include within the digital image sets 424a-424d (e.g., storage locations of or pointers to the edited digital images) or the edited digital images themselves.

In one or more embodiments, the intent-based preset system 106 generates the global editing preset map 420 by mapping edited digital images to one of the map keys 422a-422d based on their editing states. To illustrate, in some cases, the intent-based preset system 106 determines whether the editing state of an edited digital image (e.g., the vector representation of the editing state) corresponds to (e.g., matches) a map key of the global editing preset map 420. Upon determining that the editing state corresponds to the map key, the intent-based preset system 106 includes the edited digital image (e.g., the identifier for the edited digital image) within the edited digital image set associated with that map key. Thus, in one or more embodiments, the intent-based preset system 106 associates an edited digital image with a map key within the global editing preset map 420 if the map key represents the editing state (e.g., the global editing state) of the edited digital image. Further, the intent-based preset system 106 utilizes the global editing preset map 420 to associate edited digital images that resulted from the same combination of editing operations. Accordingly, as will be discussed further below, the intent-based preset system 106 can utilize the global editing preset map 420 at inference time to efficiently locate edited digital images that correspond to a user query based on their editing states.

In some embodiments, the intent-based preset system 106 also associates the initial digital images with their corresponding edited digital images within the global editing preset map 420. In some cases, the intent-based preset system 106 associates the editing presets with their corresponding edited digital images within the global editing preset map 420. In some implementations, the intent-based preset system 106 additionally or alternatively associates the initial digital images and/or the editing presets with their corresponding edited digital images within the edited digital image database that maintains the edited digital images.

As mentioned, FIGS. 5A-5C illustrate diagrams for generating a local editing preset map in accordance with one or more embodiments. Indeed, in some embodiments, the intent-based preset system 106 generates a local editing preset map to map edited digital images to local edits. In particular, in some cases, the intent-based preset system 106 generates a local editing preset map to map local edits to portions of edited digital images, such as portions containing objects portrayed in the edited digital images.

In one or more embodiments, an object includes a distinct portion of a digital image that is distinguishable from other portions of a digital image. For example, in some cases, an object includes, but is not limited to, an item, clothing, a person, an animal, food, or a structure portrayed in a digital image. In some cases, an object includes a background or foreground of a digital image or a portion of the background or foreground (e.g., the ground, the sky, or background geographical features, such as mountains).

FIG. 5A illustrates the intent-based preset system 106 detecting objects portrayed in edited digital images 502a-502b in accordance with one or more embodiments. In one or more embodiments, the intent-based preset system 106 detects the objects portrayed in the edited digital images 502a-502b utilizing an object detection neural network or neural network component. For instance, in some embodiments, the intent-based preset system 106 utilizes, to detect objects portrayed in digital images, one or more of the detection heads described in U.S. patent application Ser. No. 17/589,114 filed on Jan. 31, 2022, entitled DETECTING DIGITAL OBJECTS AND GENERATING OBJECT MASKS ON DEVICE, the contents of which are expressly incorporated herein by reference in their entirety. In some cases, the intent-based preset system 106 utilizes, to detect object, a residual convolutional neural network (RCNN). For instance, in some implementations, the intent-based preset system 106 utilizes a Faster-RCNN, such as the ResNet-101 neural network.

In some embodiments, the intent-based preset system 106 utilizes a pre-trained neural network to detect objects. In some implementations, the intent-based preset system 106 learns parameters for the neural network used to detect objects using a training dataset that includes a large number of digital images. In particular, in some cases, the intent-based preset system 106 utilizes a training dataset including digital images that represent hundreds of object classes/categories. In some instances, the intent-based preset system 106 labels the digital images with object labels and bounding boxes for the objects portrayed therein. Thus, in some cases, the intent-based preset system 106 implements supervised learning to learn the parameters of the neural network by making object predictions, comparing the predictions to the labels (e.g., via a loss function), and modifying the network parameters based on the comparison.

Thus, in one or more embodiments, the intent-based preset system 106 utilizes the neural network with the learned parameters to detect objects in edited digital images. In particular, the intent-based preset system 106 utilizes the neural network to analyze an edited digital image and provide multiple outputs based on the analysis. For instance, in some embodiments, the intent-based preset system 106 utilizes the neural network to output a bounding box, a confidence score, and a label vector. In one or more embodiments, the intent-based preset system 106 establishes a confidence score threshold. Accordingly, the intent-based preset system 106 determines to utilize a detected object in generating the local editing preset map if its confidence score satisfies the confidence score threshold.

FIG. 5B illustrates a diagram for generating a local editing preset map 510 utilizing edited digital images in accordance with one or more embodiments. In particular, as shown in FIG. 5B, the intent-based preset system 106 generates the local editing preset map 510 utilizing an edited digital image 512 and one or more masks 514 associated with the edited digital image 512. As further shown, the intent-based preset system 106 determines editing states 516 for the edited digital image 512 and the one or more masks 514. For instance, in some cases, the intent-based preset system 106 determines an editing state for the edited digital image 512 as discussed above with reference to FIG. 4B. In some implementations, the intent-based preset system 106 determines an editing state for a mask associated with the edited digital image 512 by generating a signed vector of size N, where N represents the total number of editing operations associated with the mask. Indeed, in some cases, the intent-based preset system 106 generates the signed vector for the editing state to omit editing controls that were not used. In some implementations, however, the intent-based preset system 106 generates a vector representation for the editing state of a mask having size M, similar to the editing states generated for edited digital images as a whole. Accordingly, in some embodiments, the editing states 516 include local editing states for the edited digital image 512. In particular, in some cases the editing state determined from the edited digital image 512 includes a global editing state and the editing states determined from the one or more masks 514 include local editing states.

As further shown in FIG. 5B, the intent-based preset system 106 determines object scores 518 based on the editing states 516. In particular, the intent-based preset system 106 determines one or more object scores for each object detected in the digital image (e.g., for each object having a confidence score that satisfies the established confidence score threshold). For instance, in some cases, the intent-based preset system 106 determines an object score for each object-editing state pair using the editing states 516 determined from the edited digital image 512 and the one or more masks 514. For example, in some implementations, the intent-based preset system 106 determines an object score for an object $O_i$ as follows:

$$\text{Score} = \frac{\text{(Area impacted by } X_i \cap \text{ bounding box of } O_i)}{\text{Area impacted by } X_i} \quad (1)$$

In equation 1, the area impacted by $X_i$ refers to the area of the edited digital image or the area of the mask under consideration. In one or more embodiments, the intent-based preset system 106 determines the relevant area using metadata associated with the mask or the edited digital image. Thus, in some cases, the intent-based preset system 106 utilizes equation 1 to score the impact of editing operations to an object portrayed in an edited digital image. Indeed, in some embodiments, the intent-based preset system 106 utilizes equation 1 to determine the impact of both global and local edits to object portrayed in an edited digital image.

As shown in FIG. 5B, the intent-based preset system 106 generates the local editing preset map 510 based on the object scores 518. For instance, in some cases, the intent-based preset system 106 establishes an object score threshold. The intent-based preset system 106 further generates the local editing preset map 510 utilizing editing states for the object-editing state pairs that have a score that satisfies the object score threshold. Thus, in one or more embodiments, the intent-based preset system 106 narrows down the potential object-editing state pairs (e.g., the processes discussed with reference to FIGS. 5A-5B) to include those representing significant local edits of an edited digital image.

FIG. 5C illustrates a local editing preset map 520 generated by the intent-based preset system 106 in accordance with one or more embodiments. In one or more embodiments, the intent-based preset system 106 generates the local editing preset map 520 utilizing map keys and corresponding digital images. Indeed, as shown, the local editing preset map 520 includes map keys 522a-522b and edited digital image sets 524a-524b.

In one or more embodiments, the map keys 522a-522b of the local editing preset map 520 include value pairs of local edits and objects. For instance, in some cases, the intent-based preset system 106 generates a map key for each available combination of editing operations applied to an object. Thus, in some cases, the intent-based preset system 106 generates the local editing preset map 520 to include a map key for each available combination. In some cases, however, the intent-based preset system 106 includes map keys for a subset of combinations of editing operations applied to an object within the local editing preset map 520.

Indeed, in some embodiments, the intent-based preset system 106 defines a map key for the local editing preset map 520 by generating a value pair. In particular, the intent-based preset system 106 generates a map key as a combination of various editing operations (and corresponding editing values) and an object portrayed in one or more edited digital images. To illustrate, in some cases, the intent-based preset system 106 defines a map key for the local editing preset map 520 by generating value pair that includes a signed vector (of size M or size N) and a label associated with the signed vector. In one or more embodiments, the intent-based preset system 106 utilizes the label to indicate the object associated with the signed vector. In other words, the intent-based preset system 106 utilizes the label to indicate the object to which the editing operations represented by the signed vector are applied.

As shown in FIG. 5C, the intent-based preset system 106 includes, within the edited digital image sets 524a-524b, identifiers that represent the included edited digital images. It should be understood, however, that the intent-based preset system 106 can utilize various placeholders to include within the digital image sets 524a-524b (e.g., storage locations of or pointers to the edited digital images) or the edited digital images themselves.

In one or more embodiments, the intent-based preset system 106 generates the local editing preset map 520 by mapping edited digital images to one of the map keys 522a-522b based on their editing states and portrayed objects. To illustrate, in some cases, the intent-based preset system 106 determines whether the editing state of an edited digital image (e.g., the vector representation of the editing state) corresponds to (e.g., matches) the signed vector of a map key of the local editing preset map 520. Further, the intent-based preset system 106 determines whether the object associated with the editing state corresponds to the label of the map key. Upon determining that the editing state and the object corresponds to the map key, the intent-based preset system 106 includes the edited digital image (e.g., the identifier for the edited digital image) within the edited digital image set associated with that map key. Thus, in one or more embodiments, the intent-based preset system 106 associates an edited digital image with a map key within the local editing preset map 520 if the map key represents one of the editing states (e.g., local editing states) of the edited digital image. Further, the intent-based preset system 106 utilizes the local editing preset map 520 to associate edited digital images that resulted from the same combination of editing operations applied to similar objects. Accordingly, as will be discussed further below, the intent-based preset system 106 can utilize the local editing preset map 520 at inference time to efficiently locate edited digital images that correspond to a user query based on their editing states.

In some embodiments, the intent-based preset system 106 also associates the initial digital images with their corresponding edited digital images within the local editing preset map 520. In some cases, the intent-based preset system 106 associates the editing presets with their corresponding edited digital images within the local editing preset map 520. In some implementations, the intent-based preset system 106 additionally or alternatively associates the initial digital images and/or the editing presets with their corresponding edited digital images within the edited digital image database that maintains the edited digital images.

As mentioned, FIGS. 6A-6D illustrate diagrams for learning parameters for a multi-class classification neural network in accordance with one or more embodiments. Indeed, in one or more embodiments, the intent-based preset system 106 learns parameters that facilitate use of a multi-class classification neural network in extracting editing intents from user queries. In one or more embodiments, the intent-based preset system 106 utilizes a multi-layer neural network as the multi-class classification neural network. Accordingly, in some cases, the intent-based preset system 106 learns parameters for multiple layers.

In one or more embodiments, the intent-based preset system 106 learns the parameters for the multi-class classification neural network utilizing various sets of training data. For example, in some embodiments, the intent-based preset system 106 utilizes a set of training data that includes a mapping between keywords and editing operations. To illustrate, in some cases, the intent-based preset system 106 utilizes, as training data, a set of data associated with the "contextual help" feature of Adobe Lightroom® described in *Get Started with Lightroom for Mobile* (iOS), Adobe, 2022, https://helpx.adobe.com/lightroom-cc/using/work-with-lightroom-mobile-ios.html, which is incorporated herein by reference in its entirety. FIG. 6A illustrates a graphical user interface 602 that illustrates the mapping of keywords to editing operations implemented by this feature in accordance with one or more embodiments.

Indeed, as shown in FIG. 6A, the "contextual help" feature implements a search function that provides suggested editing operations 606 in response to receiving input via a text box 604. For instance, as shown in FIG. 6A, the feature suggests an exposure operation in response to receiving the term "brighten" as input. In some cases, the mappings used by the "contextual help" feature is based on a hardcoded expert curated repository. FIG. 6B illustrates a sample mapping of the hardcoded expert curated repository in accordance with one or more embodiments.

In one or more embodiments, the intent-based preset system 106 utilizes the repository to map each keyword to a class label that corresponds to the editing operation. Thus, the intent-based preset system 106 labels the training data for supervised training. In some implementations, the intent-based preset system 106 further associates synonyms for each keyword from the repository with the corresponding class label. For instance, in some cases, the intent-based preset system 106 utilizes a lexical database, such as the WordNet database, to determine the synonyms for the keywords from the repository.

In one or more embodiments, the intent-based preset system 106 further utilizes one or more editing operation tutorial documents as training data. FIG. 6C illustrates a sample portion of an editing operation tutorial document utilized by the intent-based preset system 106 to learn parameters for a multi-class classification neural network in accordance with one or more embodiments. In one or more embodiments, the editing operation tutorial documents utilized by the intent-based preset system 106 are documents created by photography professionals. Indeed, as illustrated by FIG. 6C, the editing operation tutorial documents each include an ordered list of all the editing steps that part of the corresponding tutorial. In particular, each editing step specifies the editing controls to be changed and also an overview explanation of why the change is needed or how the change will affect the digital image.

As illustrated by the sample portion of FIG. 6C, the editing operation tutorial documents include terms "proc_overview_text" and "step_sentence_text." In one or more embodiments, the intent-based preset system 106 utilizes these terms as the input data. In some cases, the intent-based preset system 106 further utilizes the included editing control identifier (e.g., crs:Exposure2012 in the shown sample portion) as the corresponding class label.

Figure 6D:
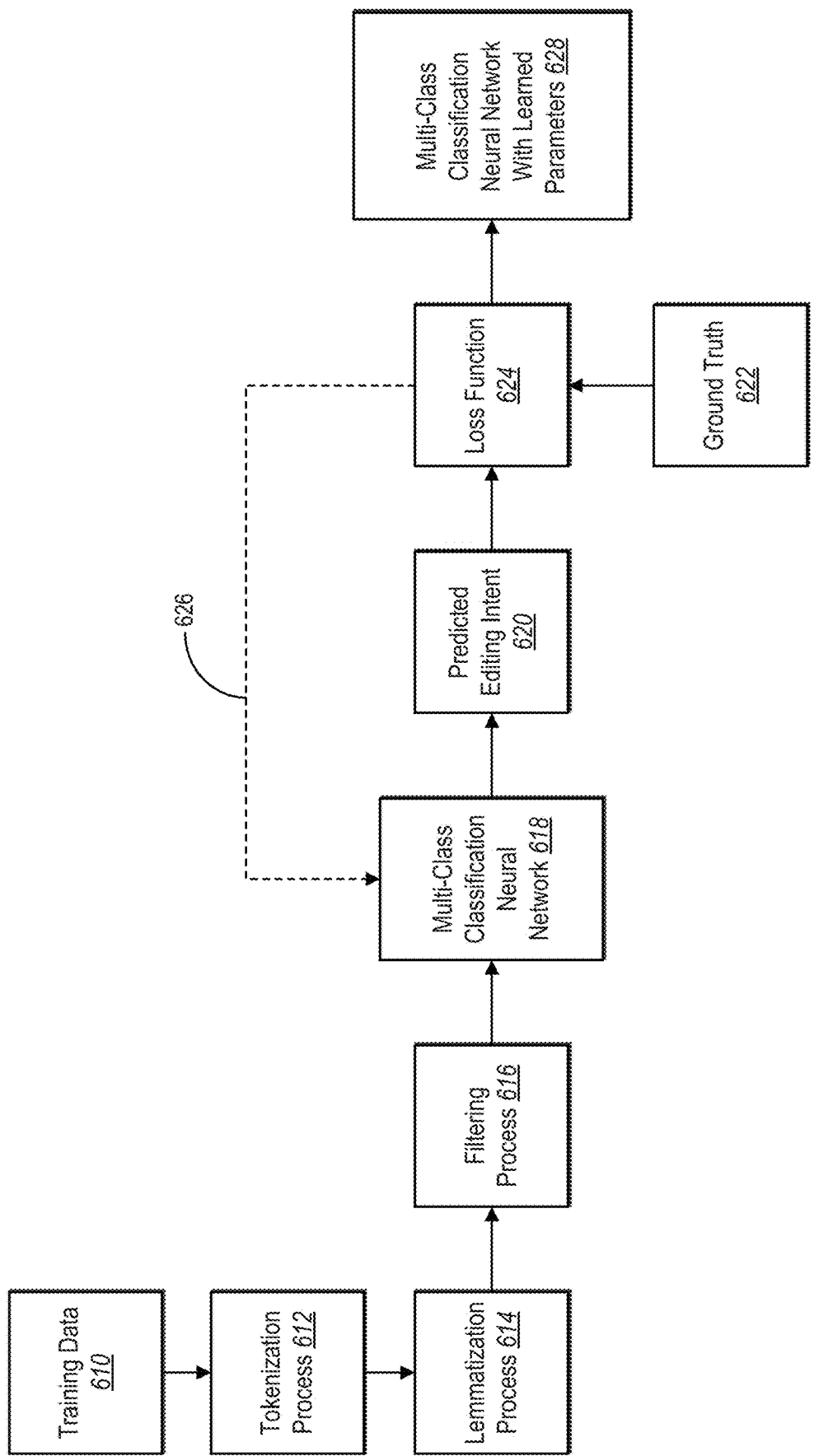
FIG. 6D illustrates a diagram for utilizing training data to learn parameters for a multi-class classification neural network in accordance with one or more embodiments.

FIG. 6D illustrates a diagram for utilizing training data 610 to learn parameters for a multi-class classification neural network 618 in accordance with one or more embodiments. As shown by FIG. 6D, the intent-based preset system 106 cleans and vectorizes the training data 610 using a pre-processing pipeline before use by the multi-class classification neural network 618.

For instance, as shown in FIG. 6D, the intent-based preset system 106 utilizes a tokenization process 612 to tokenize the training data 610. In particular, the intent-based preset system 106 tokenizes the text of the training data 610 into unigrams and bi-grams. In some embodiments, the intent-based preset system 106 utilizes bi-grams to capture the unique co-occurrence of various words in the training data 610, leading to better accuracy in some cases.

As further shown in FIG. 6D, the intent-based preset system 106 utilizes a lemmatization process 614. Indeed, in some cases, the intent-based preset system 106 utilizes the lemmatization process 614 to handle different forms of the same word. In one or more embodiments, the intent-based preset system 106 utilizes a lexical database, such as the WordNet database, to perform the lemmatization process 614.

Additionally, as shown in FIG. 6D, the intent-based preset system 106 utilizes a filtering process 616. In particular, in some embodiments, the intent-based preset system 106 passes the lemmatized output to a word filter. The intent-based preset system 106 utilizes the word filter to remove stop words (e.g., "the," "is," or "an") and specific keywords that are related to image editing (e.g., "image," "photo," or "editing). In some cases, by filtering out certain words the intent-based preset system 106 removes potential noise that would otherwise be added to the multi-class classification neural network 618.

Thus, in one or more embodiments, the intent-based preset system 106 utilizes the tokenization process 612, the lemmatization process 614, and the filtering process 616, to obtain a list of cleaned unigrams and bi-grams associated with sentences from the training data 610. In one or more embodiments, the intent-based preset system 106 further utilizes a bag-of-words approach for feature extraction combined with term frequency-inverse document frequency (TF-IDF) to generate a final input vector. As shown in FIG. 6D, the intent-based preset system 106 utilizes the multi-class classification neural network 618 to generate a predicted editing intent 620 from an input vector. The intent-based preset system 106 further compares the predicted editing intent 620 to the class labels (e.g., ground truth 622) from the training data 610. In particular, the intent-based preset system 106 performs the comparison via a loss function 624 to determine a loss and back propagates the loss (as shown by the line 626) to modify the parameters of the line 626. In some embodiments, the intent-based preset system 106 repeats the process through several training iterations, modifying the parameters to reduce the error of the multi-class classification neural network 618. Thus, in one or more embodiments, the intent-based preset system 106 generates a multi-class classification neural network with learned network parameters 628.

Figure 7:
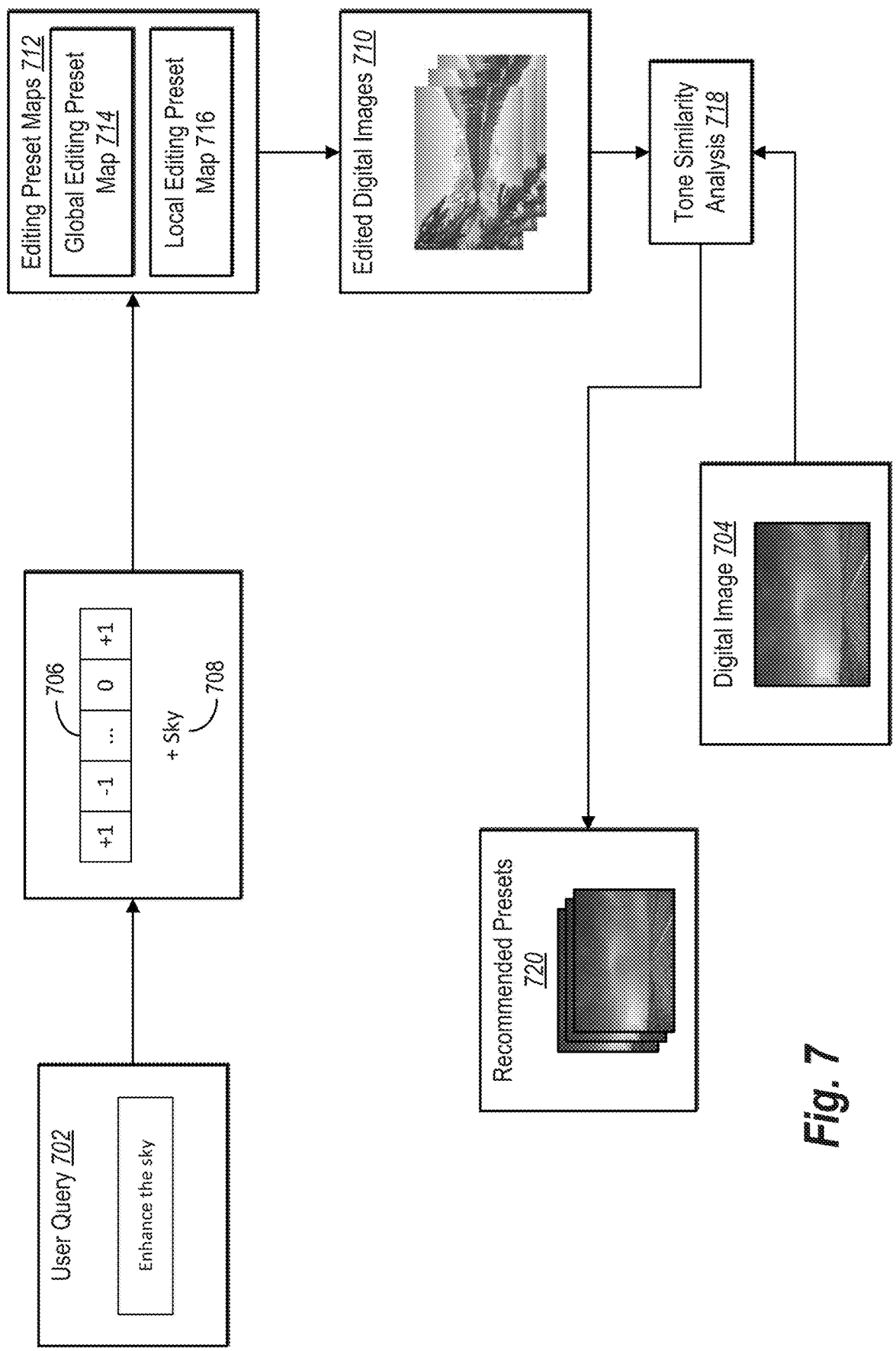
FIG. 7 illustrates a diagram for generating recommendations for editing presets in response to a user query in accordance with one or more embodiments.

As previously discussed, the intent-based preset system 106 utilizes a global editing preset map, a local editing preset map, and/or a multi-class classification neural network with learned parameters to generate recommendations for editing presets. FIG. 7 illustrates a diagram for generating recommendations for editing presets in response to a user query in accordance with one or more embodiments.

As shown in FIG. 7, the intent-based preset system 106 receives a digital image 704 and user query 702 for editing the digital image 704. In particular, the user query 702 includes a request for an editing preset that enhances the sky portrayed in the digital image 704. As further shown in FIG. 7, the intent-based preset system 106 extracts an editing intent 706 (e.g., a vector representation) from the user query 702. For instance, in some cases, the intent-based preset system 106 extracts the editing intent 706 utilizing a multi-class classification neural network having learned parameters as discussed above with reference to FIGS. 6A-6D.

Additionally, as shown in FIG. 7, the intent-based preset system 106 also extracts an object 708 from the user query 702. In particular, in some cases, the intent-based preset system 106 determines that the user query 702 targets the object 708 with the editing intent 706. In other words, the intent-based preset system 106 determines that the user query 702 requests to target editing operations indicated by the editing intent 706 to the object 708 as portrayed in the digital image 704.

In one or more embodiments, the intent-based preset system 106 extracts the object 708 from the user query 702 using a rule-based search. To illustrate, in some cases, the intent-based preset system 106 processes the user query 702 to generate a list of cleaned unigrams and bi-grams utilizing a tokenization process, a lemmatization process, and/or a filtering process as discussed above with reference to FIG. 6D. The intent-based preset system 106 further compares the resulting tokens with a set of pre-determined object classes. Upon determining that a token matches an object class, the intent-based preset system 106 determines to use the token as the object 708.

As further shown in FIG. 7, the intent-based preset system 106 generates a list of edited digital images 710 based on the user query 702 utilizing one or more editing preset maps 712. In particular, the intent-based preset system 106 generates the list of edited digital images 710 utilizing a global editing preset map 714 or a local editing preset map 716. In one or more embodiments, the intent-based preset system 106 determines to use the global editing preset map 714 or the local editing preset map 716 based on whether the user query 702 includes an object.

For instance, for user queries that do not reference an object, the intent-based preset system 106 determines to utilize the global editing preset map 714 to generate the list of edited digital images 710. In one or more embodiments, the intent-based preset system 106 utilizes the global editing preset map 714 by comparing the editing intent of the user query to each map key in the global editing preset map 714 to determine whether the editing intent is either a subset of or a match to the map key. For instance, in some cases, the intent-based preset system 106 performs a logical AND operation between the vector representation of the editing intent and a map key. If the AND operation provides a vector that is equal to the vector representation of the editing intent, the intent-based preset system 106 determines to add the edited digital images associated with that map key to the list of edited digital images 710.

In contrast, for user queries that do reference an object (e.g., the user query 702), the intent-based preset system 106 determines to utilize the local editing preset map 716 to generate the list of edited digital images 710. In one or more embodiments, the intent-based preset system 106 utilizes the local editing preset map 716 by identifying map keys that correspond to the object extracted from the user query (e.g., the object 708). For a map key that correspond to the object, the intent-based preset system 106 compares the vector of the map key to the editing intent extracted from the user query (e.g., the editing intent 706) to determine whether the editing intent is either a subset of (or a match to) the vector. For instance, in some cases, the intent-based preset system 106 performs a logical AND operation between the vector representation of the editing intent and the vector of the map key. If the AND operation provides a vector that is equal to the vector representation of the editing intent, the intent-based preset system 106 determines to add the edited digital images associated with that map key to the list of edited digital images 710.

As further shown in FIG. 7, the intent-based preset system 106 utilizes a tone similarity analysis 718 to compare the list of edited digital images 710 to the digital image 704 received with the user query 702. In particular, the intent-based preset system 106 utilizes the tone similarity analysis 718 to determine whether an edited digital image is associated with an initial tone that corresponds to the current tone of the digital image 704. In other words, in some cases, the intent-based preset system 106 determines whether the tone of the initial digital image from which the edited digital image was created matches the current tone of the digital image 704. In some implementations, the intent-based preset system 106 uses metadata associated with each image to determine the similarity of their tones. In some cases, the intent-based preset system 106 establishes a similarity score threshold and removes edited digital images whose similarity score determined via the tone similarity analysis 718 fails to satisfy the similarity score threshold.

Thus, in one or more embodiments, the intent-based preset system 106 generates recommendations 720 for editing presets using the remaining edited digital images. Indeed, in some cases, the intent-based preset system 106 determines the editing presets that are associated with the remaining edited digital images. For instance, in some implementations, the intent-based preset system 106 maintains an editing preset within the metadata of an edited digital image. Accordingly, the intent-based preset system 106 extracts the editing presets from the edited digital images that remain after the tone similarity analysis 718. The intent-based preset system 106 further generates the recommendations 720 for the editing presets and provides the recommendations 720 to the client device that submitted the user query 702.

Thus, the intent-based preset system 106 provides improved flexibility when compared to conventional systems. For instance, by recommending editing presets based on an editing intent, the intent-based preset system 106 flexibly adapts to various editing scenarios rather than rigidly providing the same editing presets regardless of editing intent as is done by many conventional systems. Further, by generating and implementing a local editing preset map for use in generating recommendations, the intent-based preset system 106 flexibly recommends editing presets that provide local edits.

Figure 8:
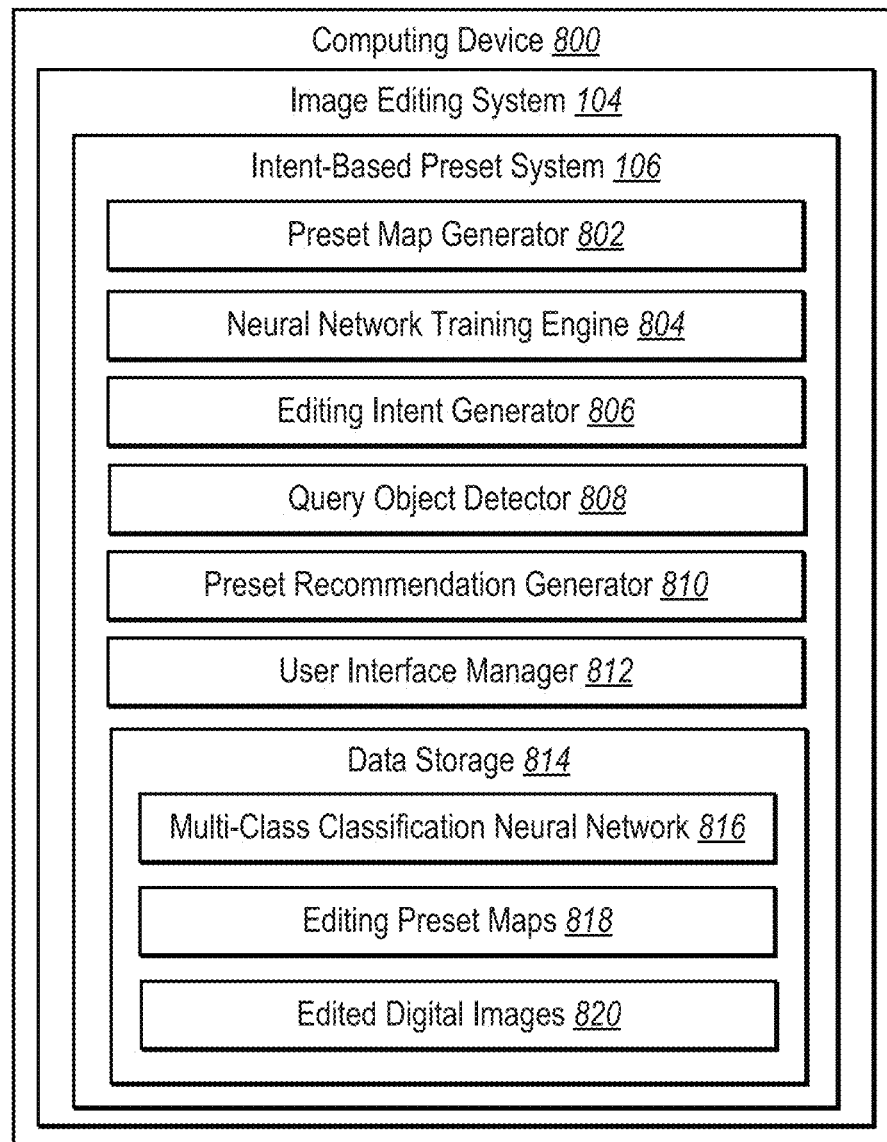
FIG. 8 illustrates an example schematic diagram of a guided inpainting curation system in accordance with one or more embodiments.

Turning now to FIG. 8, additional detail will now be provided regarding various components and capabilities of the intent-based preset system 106. In particular, FIG. 8 illustrates the intent-based preset system 106 implemented by the computing device 800 (e.g., the server(s) 102 and/or one of the client devices 110a-110n discussed above with reference to FIG. 1). Additionally, the intent-based preset system 106 is part of the image editing system 104. As shown in FIG. 8, the intent-based preset system 106 includes, but is not limited to, a preset map generator 802, a neural network training engine 804, an editing intent generator 806, a query object detector 808, a preset recommendation generator 810, a user interface manager 812, and data storage 814 (which includes a multi-class classification neural network 816, editing preset maps 818, and edited digital images 820).

As just mentioned, and as illustrated in FIG. 8, the intent-based preset system 106 includes the preset map generator 802. In one or more embodiments, the preset map generator 802 generates one or more editing preset maps that associate map keys with sets of edited digital images. For instance, in some cases, the preset map generator 802 generates a global editing preset map. In some implementations, the preset map generator 802 generates a local editing preset map.

Additionally, as shown in FIG. 8, the intent-based preset system 106 includes the neural network training engine 804. In one or more embodiments, the neural network training engine 804 learns parameters for a multi-class classification neural network that facilitate the extraction of editing intents from user queries. For instance, in some cases, the neural network training engine 804 generates a list of cleaned unigrams and bi-grams associated with sentences from training data, utilizes the multi-class classification neural network to predict editing intents from the unigrams and/or bi-grams, and modifies the network parameters based on the prediction.

Further, as shown in FIG. 8, the intent-based preset system 106 includes the editing intent generator 806. In one or more embodiments, the editing intent generator 806 extracts editing intents from user queries. For instance, in some embodiments, the editing intent generator 806 extracts editing intents from user queries using a multi-class classification neural network with learned network parameters. In some implementations, the editing intent generator 806 generates a vector representation of the editing intent.

As shown in FIG. 8, the intent-based preset system 106 also includes the query object detector 808. In one or more embodiments, the query object detector 808 extracts objects from user queries. In particular, the query object detector 808 identifies objects referenced by user queries. For instance, in some embodiments, the query object detector 808 utilizes a rule-based search approach by comparing tokens extracted from a user query to one or more predetermined object classes.

As further shown in FIG. 8, the intent-based preset system 106 includes the preset recommendation generator 810. In one or more embodiments, the preset recommendation generator 810 generates recommendations for editing presets in response to user queries. For instance, in some cases, the preset recommendation generator 810 utilizes an editing preset map to identify one or more edited digital images that correspond to the editing intent and/or the object extracted from a user query. The preset recommendation generator 810 further performs a tone similarity analysis to remove edited digital images having an initial tone that does not correspond to the current tone of the digital image to be edited. The preset recommendation generator 810 recommends editing presets associated with the remaining edited digital images.

Additionally, as shown in FIG. 8, the intent-based preset system 106 includes the user interface manager 812. In one or more embodiments, the user interface manager 812 implements a graphical user interface for receiving user input and providing editing preset recommendations in response. Indeed, in some cases, the user interface manager 812 provides a graphical user interface for display on a client device. Via the graphical user interface, the user interface manager 812 receives user input, such as a user query and a digital image to be edited. The user interface manager 812 further provides, for display within the graphical user interface, recommendations for editing presets that can be used to edit the digital image in accordance with the user query.

As shown in FIG. 8, the intent-based preset system 106 also includes data storage 814. In particular, data storage 814 (implemented by one or more memory devices) includes a multi-class classification neural network 816, editing preset maps 818, and edited digital images 820. In one or more embodiments, the multi-class classification neural network 816 stores the multi-class classification neural network used to extract editing intents from user queries. In some embodiments, the editing preset maps 818 store one or more editing preset maps (e.g., a global editing preset map and a local editing preset map) that associate map keys with edited digital images. In some implementations, the edited digital images 820 store the edited digital images and their associated metadata (which can include editing presets).

Each of the components 802-820 of the intent-based preset system 106 can include software, hardware, or both. For example, the components 802-820 can include one or more instructions stored on a computer-readable storage medium and executable by processors of one or more computing devices, such as a client device or server device. When executed by the one or more processors, the computer-executable instructions of the intent-based preset system 106 can cause the computing device(s) to perform the methods described herein. Alternatively, the components 802-820 can include hardware, such as a special-purpose processing device to perform a certain function or group of functions. Alternatively, the components 802-820 of the intent-based preset system 106 can include a combination of computer-executable instructions and hardware.

Furthermore, the components 802-820 of the intent-based preset system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-820 of the intent-based preset system 106 may be implemented as a stand-alone application, such as a desktop or mobile application. Furthermore, the components 802-820 of the intent-based preset system 106 may be implemented as one or more web-based applications hosted on a remote server. Alternatively, or additionally, the components 802-820 of the intent-based preset system 106 may be implemented in a suite of mobile device applications or "apps." For example, in one or more embodiments, the intent-based preset system 106 can comprise or operate in connection with digital software applications such as ADOBE® PHOTOSHOP® or ADOBE® LIGHTROOM®. The foregoing are either registered trademarks or trademarks of Adobe Inc. in the United States and/or other countries.

Figure 9:
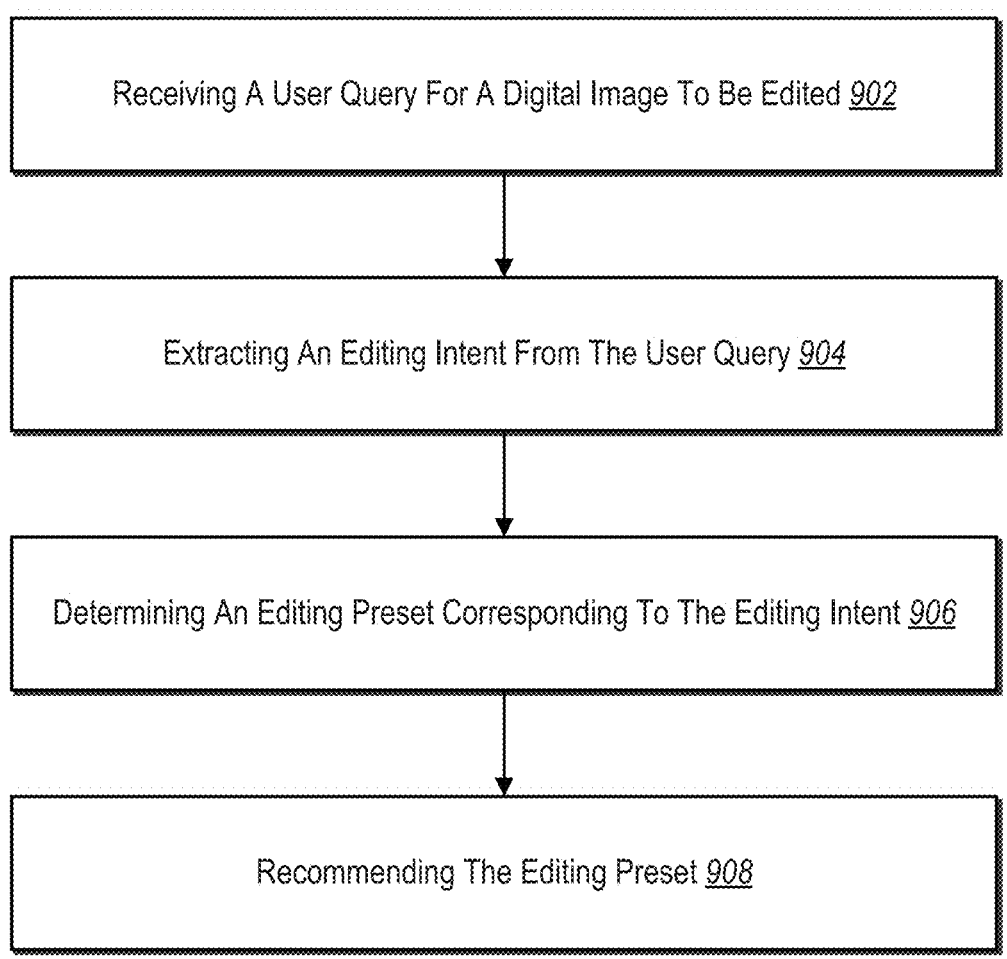
FIG. 9 illustrates a flowchart of a series of acts for generating a recommendation for an editing preset based on an editing intent in accordance with one or more embodiments.

FIGS. 1-8, the corresponding text, and the examples provide a number of different methods, systems, devices, and non-transitory computer-readable media of the intent-based preset system 106. In addition to the foregoing, one or more embodiments can also be described in terms of flowcharts comprising acts for accomplishing the particular result, as shown in FIG. 9. FIG. 9 may be performed with more or fewer acts. Further, the acts may be performed in different orders. Additionally, the acts described herein may be repeated or performed in parallel with one another or in parallel with different instances of the same or similar acts.

FIG. 9 illustrates a flowchart of a series of acts 900 for generating a recommendation for an editing preset based on an editing intent in accordance with one or more embodiments. FIG. 9 illustrates acts according to one embodiment, alternative embodiments may omit, add to, reorder, and/or modify any of the acts shown in FIG. 9. In some implementations, the acts of FIG. 9 are performed as part of a computer-implemented method. Alternatively, a non-transitory computer-readable medium can store instructions thereon that, when executed by at least one processor, cause the at least one processor to perform operations comprising the acts of FIG. 9. In some embodiments, a system performs the acts of FIG. 9. For example, in one or more embodiments, a system includes one or more memory devices. The system further includes one or more processors coupled to the one or more memory devices that cause the system to perform operations comprising the acts of FIG. 9.

The series of acts 900 includes an act 902 for receiving a user query for a digital image to be edited. For example, in one or more embodiments, the act 902 involves receiving, from a client device, a user query corresponding to a digital image to be edited.

Additionally, the series of acts 900 includes an act 904 for extracting an editing intent from the user query. For instance, in one or more embodiments, the act 904 involves extracting, from the user query, an editing intent for editing the digital image.

In one or more embodiments, extracting the editing intent from the user query comprises generating an editing intent vector from the user query utilizing a multi-class classification neural network, the editing intent vector indicating editing operations and corresponding editing values to apply in editing the digital image.

The series of acts 900 also includes an act 906 for determining an editing preset corresponding to the editing intent. To illustrate, in one or more embodiments, the act 906 involves determining an editing preset that corresponds to the editing intent based on an editing state of an edited digital image associated with the editing preset.

As mentioned in some cases, the intent-based preset system 106 generates an editing intent vector from the user query. As such, in some implementations, determining the editing preset that corresponds to the editing intent based on the editing state of the edited digital image associated with the editing preset comprises: generating a vector representation of the editing state of the edited digital image; and determining that the editing preset associated with the edited digital image corresponds to the editing intent by determining that the editing intent vector is a subset of the vector representation of the editing state or a match with the vector representation of the editing state.

In one or more embodiments, the intent-based preset system 106 generates a global editing preset map that associates a plurality of edited digital images with map keys indicating global editing states. Accordingly, in some embodiments, determining the editing preset that corresponds to the editing intent based on the editing state of the edited digital image associated with the editing preset comprises determining the editing preset that corresponds to the editing intent using the global editing preset map. In some implementations, generating the global editing preset map comprises: generating a map key for the global editing preset map, the map key representing editing operations and corresponding editing values; determining a global editing state for at least one edited digital image, the global editing state indicating a set of editing operations and a corresponding set of editing values applied to the at least one edited digital image; and associating the at least one edited digital image with the map key in response to determining that the global editing state corresponds to the map key.

In some instances, the intent-based preset system 106 generates a local editing preset map that associates a plurality of edited digital images with map keys indicating local editing states. Accordingly, in some cases, determining the editing preset that corresponds to the editing intent based on the editing state of the edited digital image associated with the editing preset comprises determining the editing preset that corresponds to the editing intent using the local editing preset map. In some embodiments, generating the local editing preset map comprises: generating a map key for the local editing preset map, the map key representing editing operations and corresponding editing values applied to an object; determining a local editing state for at least one edited digital image, the local editing state indicating a set of editing operations and a corresponding set of editing values applied to at least one object portrayed in the at least one edited digital image; and associating the at least one edited digital image with the map key in response to determining that the local editing state corresponds to the map key. In some instances, determining the local editing state for the at least one edited digital image comprises: determining a mask associated with the at least one edited digital image; determining a score for the at least one object portrayed in the at least one edited digital image using a bounding box for the at least one object and the mask; and associating an editing state of the mask with the at least one edited digital image as the local editing state based on the score for the at least one object.

In one or more embodiments, determining the editing preset that corresponds to the editing intent based on the editing state of the edited digital image associated with the editing preset comprises: determining a plurality of editing presets that correspond to the editing intent; and selecting the editing preset from the plurality of editing presets based on determining that an initial tone of the edited digital image associated with the editing preset corresponds to a current tone of the digital image to be edited.

The series of acts 900 further includes an act 908 for recommending the editing preset. In particular, in some cases, the act 908 involves generating, for provision to the client device, a recommendation for the editing preset.

To provide an example, in some cases, the intent-based preset system 106 receives, from a client device, a user query corresponding to a digital image to be edited; extracts, from the user query, an editing intent for editing the digital image; determines an editing preset that corresponds to the editing intent based on an editing state of an edited digital image associated with the editing preset; and generates, for provision to the client device, a recommendation for the editing preset.

In some cases, the intent-based preset system 106 further extracts, from the user query, an object portrayed in the digital image to be modified. Accordingly, in some cases, determining the editing preset that corresponds to the editing intent comprises determining the editing preset that corresponds to the editing intent and the object extracted from the user query. To illustrate, in some instances, determining the editing preset that corresponds to the editing intent and the object extracted from the user query comprises: determining a map key of a local editing preset map that includes a value pair corresponding to the editing intent and the object extracted from the user query; and determining that the edited digital image associated with the editing preset is referenced in association with the map key within the local editing preset map.

In one or more embodiments, determining the editing preset that corresponds to the editing intent based on the editing state of the edited digital image associated with the editing preset comprises: determining a map key of a global editing preset map that corresponds to the editing intent extracted from the user query; and determining that the edited digital image associated with the editing preset is referenced in association with the map key within the global editing preset map based on the editing state of the edited digital image. In some embodiments, extracting the editing intent from the user query comprises generating an editing intent vector from the user query; and determining the map key that corresponds to the editing intent comprises determining that the map key corresponds to the editing intent by comparing the editing intent vector with the map key, the map key comprising a vector representation of editing operations and corresponding editing values.

In some instances, the intent-based preset system 106 further receives, from the client device, a selection of the editing preset from the recommendation; and modifying the digital image utilizing the editing preset. In some cases, determining the editing preset that corresponds to the editing intent based on the editing state of the edited digital image associated with the editing preset comprises: determining a list of editing presets that correspond to the editing intent; removing a set of editing presets from the list of editing presets based on determining that an initial tone of edited digital images associated with the set of editing presets fail to satisfy a similarity score threshold that indicates a similarity between the initial tone and a current tone of the digital image to be edited; and determining that the editing preset remains on the list of editing presets after removing the set of editing presets from the list of editing presets.

To provide another example, in one or more embodiments, the intent-based preset system 106 generates an editing preset map between a plurality of edited digital images and a plurality of editing states that correspond to the plurality of edited digital images; extracting, from a user query, an editing intent for editing a digital image based on an edited digital image from the plurality of edited digital images; determining, in response to the user query, at least one edited digital image from the plurality of edited digital images that corresponds to the editing intent using the editing preset map; and generating a recommendation for an editing preset that comprises pre-saved editing settings associated with the at least one edited digital image.

In one or more embodiments, generating the editing preset map between the plurality of edited digital images and the plurality of editing states that correspond to the plurality of edited digital images comprises: generating a global editing preset map that associates a plurality of edited digital images with map keys indicating global editing states of the plurality of edited digital images; and generating a local editing preset map that associates one or more edited digital images with additional map keys indicating local editing states of the one or more edited digital images. In some cases, the intent-based preset system 106 further determines whether the user query references an object portrayed in the digital image to be edited; and determines to use the global editing preset map or the local editing preset map for recommending editing presets for editing the digital image based on whether the user query references the object. Further, in some instances, the intent-based preset system 106 modifies the digital image utilizing the pre-saved editing settings of the editing preset associated with the at least one edited digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
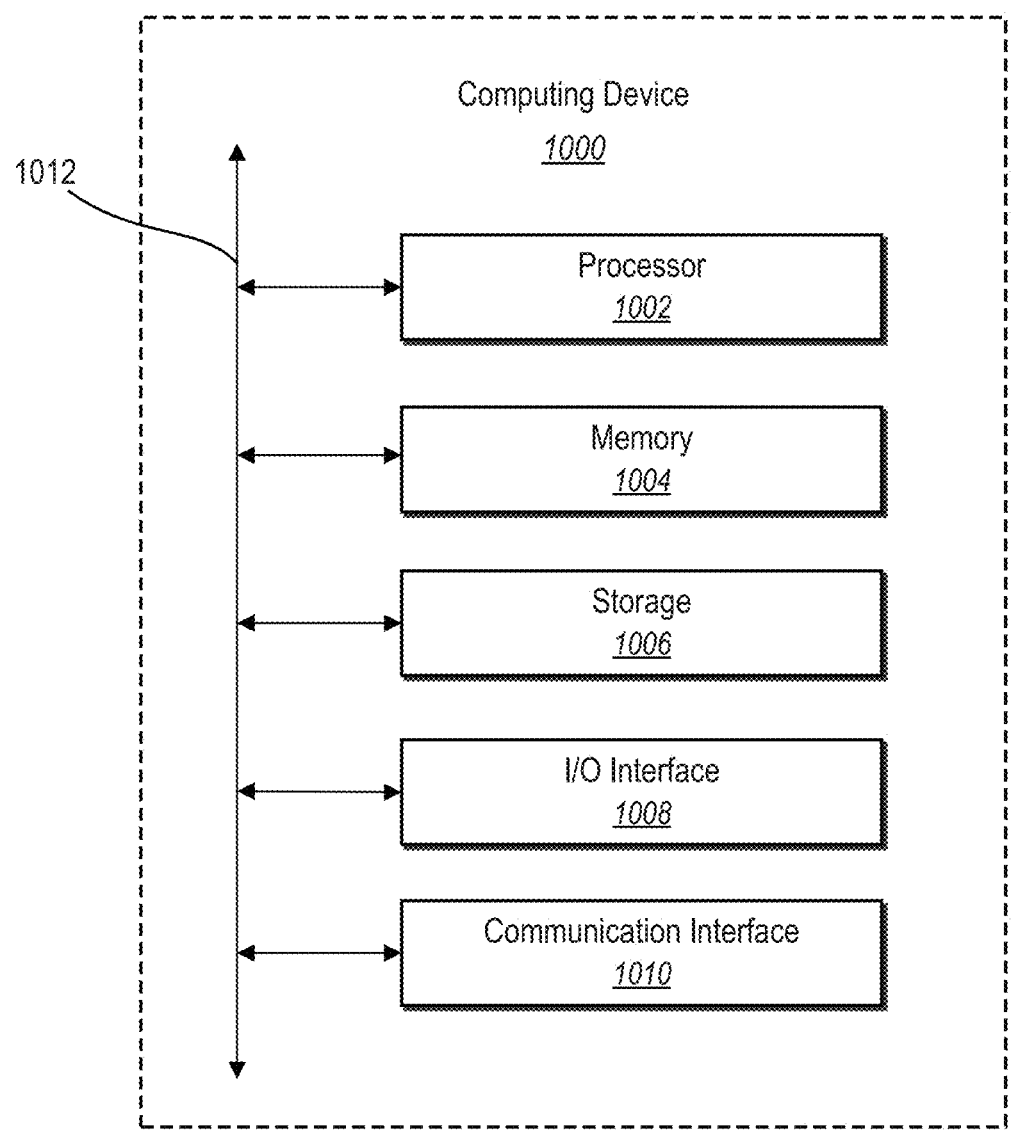
FIG. 10 illustrates a block diagram of an exemplary computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 102 and/or the client devices 110a-110n). In one or more embodiments, the computing device 1000 may be a mobile device (e.g., a mobile telephone, a smartphone, a PDA, a tablet, a laptop, a camera, a tracker, a watch, a wearable device). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 including storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   generating an editing preset map between a plurality of edited digital images and a plurality of editing states that correspond to the plurality of edited digital images, the plurality of editing states including one or more editing operations and one or more editing values corresponding to the one or more editing operations that indicate modifications made to a plurality of initial digital images to generate the plurality of edited digital images;
   receiving, from a client device, a user query corresponding to a first digital image to be edited;
   extracting, from the user query, an editing intent for editing the first digital image based on at least one edited digital image from the plurality of edited digital images;
   determining, using the editing preset map, an editing preset that corresponds to the editing intent based on an editing state of an edited digital image associated with the editing preset, wherein the edited digital image comprises a second digital image that differs from the first digital image to be edited, and wherein the editing state includes at least one editing operation and at least one editing value corresponding to the at least one editing operation that indicate modifications made to an initial digital image to generate the edited digital image; and
   generating, for provision to the client device, a recommendation for the editing preset that comprises pre-saved editing settings associated with the at least one editing operation and the at least one editing value.

2. The computer-implemented method of claim 1, wherein:
   generating the editing preset map comprises generating a global editing preset map that associates a plurality of edited digital images with map keys indicating global editing states; and
   determining the editing preset that corresponds to the editing intent based on the editing state of the edited digital image associated with the editing preset comprises determining the editing preset that corresponds to the editing intent using the global editing preset map.

3. The computer-implemented method of claim 2, wherein generating the global editing preset map comprises:
   generating a map key for the global editing preset map, the map key representing the one or more editing operations and the one or more editing values corresponding to the one or more editing operations;
   determining a global editing state for at least one edited digital image, the global editing state indicating a set of editing operations and a corresponding set of editing values applied to the at least one edited digital image; and
   associating the at least one edited digital image with the map key in response to determining that the global editing state corresponds to the map key.

4. The computer-implemented method of claim 1, wherein:
   generating the editing preset map comprises generating a local editing preset map that associates a plurality of edited digital images with map keys indicating local editing states; and
   determining the editing preset that corresponds to the editing intent based on the editing state of the edited digital image associated with the editing preset comprises determining the editing preset that corresponds to the editing intent using the local editing preset map.

5. The computer-implemented method of claim 4, wherein generating the local editing preset map comprises:
   generating a map key for the local editing preset map, the map key representing the one or more editing operations and the one or more editing values corresponding to the one or more editing operations applied to an object;
   determining a local editing state for at least one edited digital image, the local editing state indicating a set of editing operations and a corresponding set of editing values applied to at least one object portrayed in the at least one edited digital image; and
   associating the at least one edited digital image with the map key in response to determining that the local editing state corresponds to the map key.

6. The computer-implemented method of claim 5, wherein determining the local editing state for the at least one edited digital image comprises:
   determining a mask associated with the at least one edited digital image;
   determining a score for the at least one object portrayed in the at least one edited digital image using a bounding box for the at least one object and the mask; and
   associating an editing state of the mask with the at least one edited digital image as the local editing state based on the score for the at least one object.

7. The computer-implemented method of claim 1, wherein extracting the editing intent from the user query comprises generating an editing intent vector from the user query utilizing a multi-class classification neural network, the editing intent vector indicating the at least one editing operation and the at least one editing value corresponding to the at least one editing operation to apply in editing the first digital image,
  wherein the at least one editing operation includes one or more processes that were performed to modify the initial digital image, and the at least one editing value includes one or more values that control how the one or more editing operations were used to modify the initial digital image.

8. The computer-implemented method of claim 7, wherein determining the editing preset that corresponds to the editing intent based on the editing state of the edited digital image associated with the editing preset comprises:
  generating a vector representation of the editing state of the edited digital image; and
  determining that the editing preset associated with the edited digital image corresponds to the editing intent by determining that the editing intent vector is a subset of the vector representation of the editing state or a match with the vector representation of the editing state.

9. The computer-implemented method of claim 1, wherein determining the editing preset that corresponds to the editing intent based on the editing state of the edited digital image associated with the editing preset comprises:
  determining a plurality of editing presets that correspond to the editing intent; and
  selecting the editing preset from the plurality of editing presets based on determining that an initial tone of the edited digital image associated with the editing preset corresponds to a current tone of the first digital image to be edited.

10. A non-transitory computer-readable medium storing instructions thereon that, when executed by at least one processor, cause the at least one processor to perform operations comprising:
  generating an editing preset map between a plurality of edited digital images and a plurality of editing states that correspond to the plurality of edited digital images, the plurality of editing states including one or more editing operations and one or more editing values corresponding to the one or more editing operations that indicate modifications made to a plurality of initial digital images to generate the plurality of edited digital images;
  receiving, from a client device, a user query corresponding to a first digital image to be edited;
  extracting, from the user query, an editing intent for editing the first digital image based on at least one edited digital image from the plurality of edited digital images;
  determining, using the editing preset map, an editing preset that corresponds to the editing intent based on an editing state of an edited digital image associated with the editing preset, wherein the edited digital image comprises a second digital image that differs from the first digital image to be edited, and wherein the editing state includes at least one editing operation and at least one editing value corresponding to the at least one editing operation that indicate modifications made to an initial digital image to generate the edited digital image; and
  generating, for provision to the client device, a recommendation for the editing preset that comprises pre-saved editing settings associated with the at least one editing operation and the at least one editing value.

11. The non-transitory computer-readable medium of claim 10, further comprising instructions that, when executed by the at least one processor, cause the at least one processor to perform operations comprising extracting, from the user query, an object portrayed in the first digital image to be modified,
  wherein determining the editing preset that corresponds to the editing intent comprises determining the editing preset that corresponds to the editing intent and the object extracted from the user query.

12. The non-transitory computer-readable medium of claim 11, wherein determining, using the editing preset map, the editing preset that corresponds to the editing intent and the object extracted from the user query comprises:
  determining a map key of a local editing preset map that includes a value pair corresponding to the editing intent and the object extracted from the user query; and
  determining that the edited digital image associated with the editing preset is referenced in association with the map key within the local editing preset map.

13. The non-transitory computer-readable medium of claim 10, wherein determining, using the editing preset map, the editing preset that corresponds to the editing intent based on the editing state of the edited digital image associated with the editing preset comprises:
  determining a map key of a global editing preset map that corresponds to the editing intent extracted from the user query; and
  determining that the edited digital image associated with the editing preset is referenced in association with the map key within the global editing preset map based on the editing state of the edited digital image.

14. The non-transitory computer-readable medium of claim 13, wherein:
  extracting the editing intent from the user query comprises generating an editing intent vector from the user query; and
  determining the map key that corresponds to the editing intent comprises determining that the map key corresponds to the editing intent by comparing the editing intent vector with the map key, the map key comprising a vector representation of the at least one editing operation and the at least one editing value corresponding to the at least one editing operation.

15. The non-transitory computer-readable medium of claim 10, further comprising instructions that, when executed by the at least one processor, cause the at least one processor to perform operations comprising:
  receiving, from the client device, a selection of the editing preset from the recommendation; and
  modifying the first digital image utilizing the editing preset.

16. The non-transitory computer-readable medium of claim 10, wherein determining the editing preset that corresponds to the editing intent based on the editing state of the edited digital image associated with the editing preset comprises:
  determining a list of editing presets that correspond to the editing intent;
  removing a set of editing presets from the list of editing presets based on determining that an initial tone of edited digital images associated with the set of editing presets fail to satisfy a similarity score threshold that indicates a similarity between the initial tone and a current tone of the first digital image to be edited; and
  determining that the editing preset remains on the list of editing presets after removing the set of editing presets from the list of editing presets.

17. A system comprising:
one or more memory devices; and
one or more processors coupled to the one or more memory devices that cause the system to perform operations comprising:
generating an editing preset map between a plurality of edited digital images and a plurality of editing states that correspond to the plurality of edited digital images, the plurality of editing states including one or more editing operations and one or more editing values corresponding to the one or more editing operations that indicate modifications made to a plurality of initial digital images to generate the plurality of edited digital images;
extracting, from a user query, an editing intent for editing a first digital image that differs from the plurality of edited digital images based on an edited digital image from the plurality of edited digital images;
determining, in response to the user query, at least one edited digital image from the plurality of edited digital images that corresponds to the editing intent using the editing preset map; and
generating a recommendation for an editing preset that comprises pre-saved editing settings associated with the at least one edited digital image.

18. The system of claim 17, wherein generating the editing preset map between the plurality of edited digital images and the plurality of editing states that correspond to the plurality of edited digital images comprises:
generating a global editing preset map that associates a plurality of edited digital images with map keys indicating global editing states of the plurality of edited digital images; and
generating a local editing preset map that associates one or more edited digital images with additional map keys indicating local editing states of the one or more edited digital images.

19. The system of claim 18, wherein the one or more processors are further configured to cause the system to perform operations comprising:
determining whether the user query references an object portrayed in the first digital image to be edited; and
determining to use the global editing preset map or the local editing preset map for recommending editing presets for editing the first digital image based on whether the user query references the object.

20. The system of claim 17, wherein the one or more processors are further configured to cause the system to perform operations comprising modifying the first digital image utilizing the pre-saved editing settings of the editing preset associated with the at least one edited digital image.

* * * * *